(12) United States Patent
Shi et al.

(10) Patent No.: US 9,930,649 B2
(45) Date of Patent: Mar. 27, 2018

(54) METHOD AND APPARATUS FOR TRANSMITTING DOWNLINK CONTROL INFORMATION

(71) Applicant: ZTE Corporation, Shenzhen, Guangdong (CN)

(72) Inventors: Jing Shi, Shenzhen (CN); Bo Dai, Shenzhen (CN); Wei Gou, Shenzhen (CN); Zhaohua Lu, Shenzhen (CN); Shuqiang Xia, Shenzhen (CN); Xincai Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 24 days.

(21) Appl. No.: 14/425,571

(22) PCT Filed: Sep. 4, 2013

(86) PCT No.: PCT/CN2013/082957
§ 371 (c)(1),
(2) Date: Mar. 3, 2015

(87) PCT Pub. No.: WO2014/048232
PCT Pub. Date: Apr. 3, 2014

(65) Prior Publication Data
US 2015/0237604 A1    Aug. 20, 2015

(30) Foreign Application Priority Data

Sep. 29, 2012  (CN) .......................... 2012 1 0375984

(51) Int. Cl.
*H04W 4/00* (2009.01)
*H04W 72/04* (2009.01)
(Continued)

(52) U.S. Cl.
CPC ............. *H04W 72/042* (2013.01); *H04L 5/14* (2013.01); *H04L 27/2607* (2013.01);
(Continued)

(58) Field of Classification Search
CPC ............. H04W 72/042; H04W 72/005; H04W 72/0446; H04W 76/046; H04L 5/14; H04L 27/2607
See application file for complete search history.

(56) References Cited

U.S. PATENT DOCUMENTS 9,226,278 B2 * 12/2015 Chen .................... H04W 52/243
2010/0254329 A1 * 10/2010 Pan ......................... H04L 5/001
370/329

(Continued)

FOREIGN PATENT DOCUMENTS

| CN | 101945403 A | 1/2011 |
|---|---|---|
| CN | 102170703 A | 8/2011 |

(Continued)

OTHER PUBLICATIONS

Supplementary European Search Report in European application number: 13842529.3, dated Nov. 13, 2015.

(Continued)

*Primary Examiner* — Kevin Mew
(74) *Attorney, Agent, or Firm* — Oppedahl Patent Law Firm LLC

(57) ABSTRACT

A base station determines a time domain position and a frequency domain position of an enhanced search space bearing downlink control information, and sends the downlink control information on the time domain position and the frequency domain position. With the present invention, the problem that a search space of a PDCCH area cannot be used to transmit downlink control information is solved by transmitting the downlink control information through an (Continued)

enhanced search space when an NCT is independently operated and a low-cost terminal is accessing a large bandwidth system.

14 Claims, 4 Drawing Sheets

(51) Int. Cl.
　　*H04L 5/14*　　　(2006.01)
　　*H04W 72/00*　　(2009.01)
　　*H04W 76/04*　　(2009.01)
　　*H04L 27/26*　　 (2006.01)

(52) U.S. Cl.
　　CPC ..... *H04W 72/005* (2013.01); *H04W 72/0446* (2013.01); *H04W 76/046* (2013.01)

(56) References Cited

U.S. PATENT DOCUMENTS

| | | | |
|---|---|---|---|
| 2011/0243090 A1* | 10/2011 | Grovlen | H04L 1/18 370/329 |
| 2011/0286413 A1 | 11/2011 | Nishio et al. | |
| 2011/0292891 A1 | 12/2011 | Hsieh | |
| 2012/0207099 A1* | 8/2012 | Lindh | H04L 5/0057 370/329 |
| 2013/0003639 A1* | 1/2013 | Noh | H04L 5/0053 370/312 |
| 2013/0039299 A1* | 2/2013 | Papasakellariou | H04L 1/0073 370/329 |
| 2013/0058240 A1 | 3/2013 | Kim | |
| 2013/0223366 A1* | 8/2013 | Papasakellariou | H04W 72/042 370/329 |
| 2013/0235821 A1* | 9/2013 | Chen | H04W 72/0406 370/329 |
| 2013/0315159 A1* | 11/2013 | Xia | H04W 72/042 370/329 |
| 2014/0003349 A1* | 1/2014 | Kang | H04L 5/0053 370/328 |
| 2014/0003379 A1 | 1/2014 | Kang | |
| 2014/0078998 A1 | 3/2014 | Hsieh et al. | |
| 2015/0043496 A1 | 2/2015 | Kim et al. | |
| 2015/0078266 A1* | 3/2015 | Guo | H04W 72/042 370/329 |
| 2015/0103800 A1* | 4/2015 | Seo | H04W 56/00 370/330 |
| 2015/0223210 A1* | 8/2015 | Guo | H04W 72/04 370/329 |
| 2015/0230210 A1* | 8/2015 | Lee | H04L 5/0048 370/329 |
| 2015/0296489 A1* | 10/2015 | Dai | H04L 5/0053 370/329 |
| 2016/0119946 A1* | 4/2016 | Dai | H04L 1/00 370/329 |
| 2016/0345311 A1* | 11/2016 | Chen | H04L 5/00 |

FOREIGN PATENT DOCUMENTS

| | | |
|---|---|---|
| CN | 102264135 A | 11/2011 |
| CN | 102315870 A | 1/2012 |
| CN | 102378366 A | 3/2012 |
| CN | 102469048 A | 5/2012 |
| CN | 102625456 A | 8/2012 |
| WO | 2011023117 A1 | 3/2011 |
| WO | 2011126329 A2 | 10/2011 |
| WO | 2011143480 A1 | 11/2011 |
| WO | 2012118270 A1 | 9/2012 |

OTHER PUBLICATIONS

International Search Report in international application number: PCT/CN2013/082957, dated Dec. 12, 2013.
English Translation of the Written Opinion of the International Search Authority in international application number: PCT/CN2013/082957, dated Dec. 12, 2013.
E-PDCCH Search Space Feb. 10, 2012.
R1-101882, Nokia, Nokia Siemens Networks, "On UE specific search space definitions for cross-CC scheduling for carrier aggregation".
R1-103577, ZTE, "PDCCH search space for cross-carrier scheduling in LTE-A".

* cited by examiner

Fig. 1
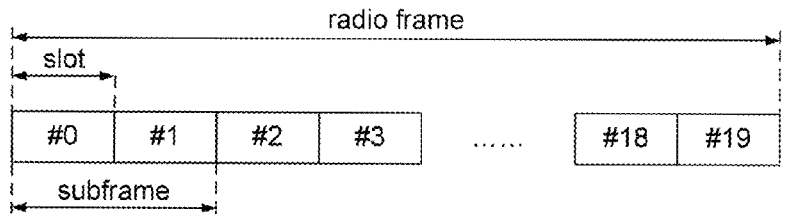
Fig. 2
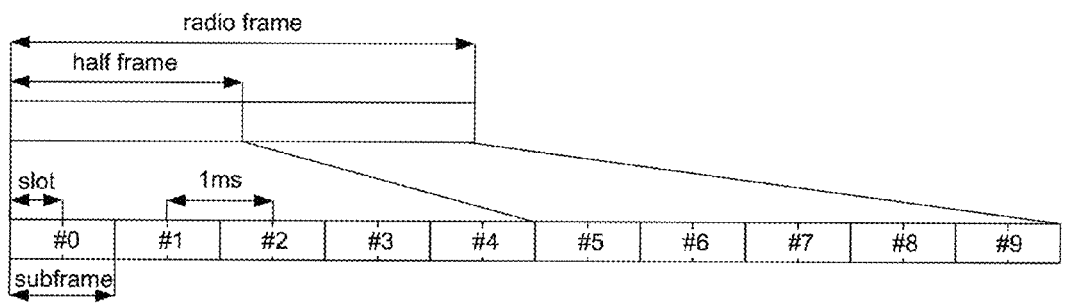
Fig. 3
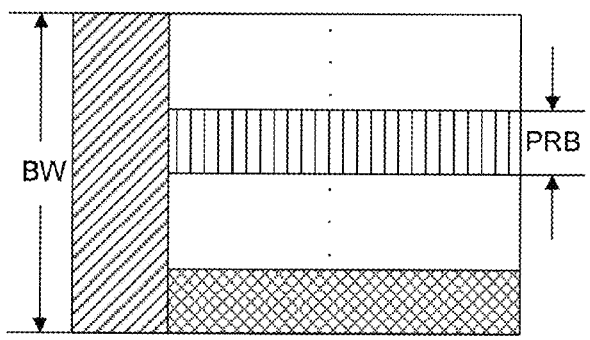
Fig. 4
101. a base station determines positions of a DCI-bearing enhanced search space in a time domain and a frequency domain
102. the base station transmits DCI at the positions of the enhanced search space in the time domain and the frequency domain

METHOD AND APPARATUS FOR TRANSMITTING DOWNLINK CONTROL INFORMATION

TECHNICAL FIELD

The disclosure relates to radio communication technology, and in particular to a method and apparatus for transmitting Downlink Control Information (DCI).

BACKGROUND

A radio frame in a Long Term Evolution (LTE) system and an enhanced LTE (LTE-A, LTE-Advance) system may include a frame structure in a Frequency Division Duplex (FDD) mode and a Time Division Duplex (TDD) mode. With a frame structure in an FDD mode is as shown in FIG. 1, a radio frame of 10 milliseconds (ms) consists of ten subframes numbered as subframe 0-9 respectively, each with a length of 1 ms; a subframe consists of two slots each with a length of 0.5 ms. With a frame structure in a TDD mode as shown in FIG. 2, a radio frame of 10 ms consists of two half frames each with a length of 5 ms; a half frame includes 5 subframes each with a length of 1 ms. In both frame structures, with a Normal Cyclic Prefix (CP), a slot contains 7 symbols each with a length of 66.7 microseconds (us). A Cyclic Prefix (CP) of a first symbol thereof has a length of 5.21 us. A CP of each of the other 6 symbols has a length of 4.69 us. In case of an Extended CP, a slot contains 6 symbols, each with a CP of a length of 16.67 us.

An LTE system corresponds to Release 8 (R8). An LTE-A system corresponds to Release 10 (R10). In both R8 and R10, a Physical Downlink Control Channel (PDCCH) is used for transmitting Downlink Control Information (DCI). In a subframe, a PDCCH is in general configured in the first Orthogonal Frequency Division Multiplexing (OFDM) symbols. In general the first N OFDM symbols may be referred to as a control channel area. In general, a Physical Downlink Shared Channel (PDSCH) is right next to the control channel area; transmitted data occupy physical resources in units of Physical Resource Block (PRB) pairs.

A DCI format may include: a DCI format 0, a DCI format 1, a DCI format 1A, a DCI format 1B, a DCI format 1C, a DCI format 1D, a DCI format 2, a DCI format 2A, a DCI format 2B, a DCI format 2C, a DCI format 3, a DCI format 3A, and a DCI format 4.

The DCI format 0 and the DCI format 4 may be configured for Physical Uplink Shared Channel (PUSCH) scheduling. The DCI format 1, the DCI format 1A, the DCI format 1B, the DCI format 1C, and the DCI format 1D may be configured for indicating a mode in PDSCH codeword scheduling. The DCI format 2, the DCI format 2A, the DCI format 2B, and the DCI format 2C may be configured for indicating a mode in Space Division Multiplexing. The DCI format 3 and the DCI format 3A may be configured for indicating a mode in Physical Uplink Control Channel (PUCCH) and PUSCH power control commands.

Physical resources for PDCCH transmission are managed in units of Control Channel Elements (CCE). A CCE consists of 9 Resource Element Groups (REG), namely, 36 Resource Elements (RE). A PDCCH may occupy 1, 2, 4, or 8 CCEs. A PDCCH occupying 1, 2, 4, or 8 CCEs may adopt tree-like aggregation. Namely, a PDCCH occupying 1 CCE may occupy any CCE; a PDCCH occupying 2 CCEs may perform CCE occupation starting from an even CCE position; a PDCCH occupying 4 CCEs may perform CCE occupation starting from a CCE position corresponding to multiples of 4; a PDCCH occupying 8 CCEs may perform CCE occupation starting from a CCE position corresponding to multiples of 8.

Defined for each aggregation level is a search space, including a common search space and a User Equipment (UE) specific (UE-Specific) search space. A common search space may bear common information on a System Information Block (SIB), Random Access Response (RAR) and Paging. A UE-Specific search space may bear information on uplink and downlink scheduling authorization for a UE. In receiving DCI, a UE should detect common search spaces of aggregation levels 4 and 8, and UE-Specific search spaces of aggregation levels 1, 2, 4, and 8. A common search space and a UE-Specific search space may overlap. A specific number of detections and a corresponding search space is as shown in Table 1.

TABLE 1

| type | aggregration level | search space size | candidate set |
| --- | --- | --- | --- |
| user-specific search space | 1 | 6 | 6 |
| | 2 | 12 | 6 |
| | 4 | 8 | 2 |
| | 8 | 16 | 2 |
| common search space | 4 | 16 | 4 |
| | 8 | 16 | 2 |

In a release after R10, in order to increase control channel transmission capacity and support more user control signaling, a new control channel area, referred to as an enhanced PDCCH (ePDCCH), is set, as shown in FIG. 3, with a bandwidth BW, a hatched PDCCH portion, an ePDCCH portion marked with vertical lines, and a meshed PDSCH portion. An ePDCCH occupies resources formerly occupied by a PDSCH.

Research is to be done on designing a common search space in an ePDCCH. At present, common information may be transmitted using a common search space of a PDCCH area. However, no solution exists for New Carrier Type (NCT) independent operation or for access of a large-bandwidth system by a Low Cost UE. In either case, common information may not be transmitted using a common search space of a PDCCH area, and no solution for interference among common search spaces in a heterogeneous network is available.

SUMMARY

It is desired that embodiment herein provide a method and apparatus for transmitting DCI, capable of implementing DCI transmission through an enhanced search space in both NCT independent operation and access of a large-bandwidth system by a low cost UE when DCI may not be transmitted using a search space of a PDCCH area.

A technical solution according to an embodiment herein is implemented as follows.

According to an embodiment herein, a method for transmitting Downlink Control Information (DCI) includes:
determining, by a base station, positions of a DCI-bearing enhanced search space in a time domain and a frequency domain; and transmitting DCI at the positions of the enhanced search space in the time domain and the frequency domain.

The determining, by a base station, positions of a DCI-bearing enhanced search space in a time domain and a frequency domain may include: predefining, by the base station, the positions of the DCI-bearing enhanced search space in the time domain and the frequency domain, or determining, by the base station according to a first parameter, the positions of the enhanced search space in the time domain and the frequency domain, the first parameter being at least one of: a subframe type, a Cyclic Prefix (CP) type, a system bandwidth, a time-frequency position indicating signaling, a User Equipment (UE) type, and a component carrier type.

The predefining, by the base station, the position of the DCI-bearing enhanced search space in the time domain may include: predefining, in the time domain, the position of the DCI-bearing enhanced search space in the time domain as a position other than any Orthogonal Frequency Division Multiplexing (OFDM) symbol position occupied by a Physical Downlink Control Channel (PDCCH) in any subframe or in a subframe other than subframes 0 and 5, or as starting from an OFDM symbol starting position in any subframe or in a subframe other than subframes 0 and 5.

The predefining, by the base station, the position of the DCI-bearing enhanced search space in the frequency domain may include: predefining, in the frequency domain, the position of the DCI-bearing enhanced search space in the frequency domain as 2*N Physical Resource Block (PRB) pairs of two sidebands in the frequency domain, or N PRB pairs mapped with equal intervals, or N discrete PRB pairs around a center frequency corresponding to a 1.4 MHz bandwidth, or N fixed successive PRB pairs around a center frequency corresponding to a 1.4 MHz bandwidth, or top N PRB pairs according to PRB numbering, the N being a natural number.

The determining, by the base station according to a first parameter, the positions of the enhanced search space in the time domain and the frequency domain may include:

determining, by the base station, the positions of the enhanced search space in the time domain and the frequency domain according to an Orthogonal Frequency Division Multiplexing (OFDM) symbol starting position in case of a small bandwidth and an OFDM symbol starting position in case of a large bandwidth, the small bandwidth referring to the system bandwidth less than or equal to k PRBs, the large bandwidth referring to the system bandwidth greater than or equal to h PRBs, the k, h being natural numbers;

or determining, by the base station according to an Orthogonal Frequency Division Multiplexing (OFDM) symbol starting position in a general subframe and an OFDM symbol starting position in a Multicast/Broadcast over Single Frequency Network (MBSFN) subframe, the positions of the enhanced search space in the time domain and the frequency domain;

or determining, by the base station according to an Orthogonal Frequency Division Multiplexing (OFDM) symbol starting position in a general subframe and an OFDM symbol starting position in a Time Division Duplex (TDD) special subframe, the positions of the enhanced search space in the time domain and the frequency domain;

or determining, by the base station according to an Orthogonal Frequency Division Multiplexing (OFDM) symbol starting position of a Long Term Evolution (LTE) UE and an OFDM symbol starting position of a low cost UE, the positions of the enhanced search space in the time domain and the frequency domain;

or determining, by the base station according to an Orthogonal Frequency Division Multiplexing (OFDM) symbol starting position of a routine component carrier and an OFDM symbol starting position of a new-type component carrier, the positions of the enhanced search space in the time domain and the frequency domain;

or determining, by the base station according to time-frequency position indicating signaling carried by a Physical Broadcast Channel (PBCH), the positions of the enhanced search space in the time domain and the frequency domain.

The enhanced search space may be an enhanced common search space or an enhanced user-specific search space.

When the enhanced search space is an enhanced user-specific search space, before receiving radio resource control (RRC) signaling, the base station may predefine the positions of the enhanced user-specific search space in the time domain and the frequency domain, and after receiving the RRC signaling, determine, according to the RRC signaling, the positions of the enhanced user-specific search space in the time domain and the frequency domain.

The DCI may be borne in the enhanced common search space or the enhanced user-specific search space.

The DCI borne in the enhanced user-specific search space may be user-specific information and common information, or may be user-specific information.

An aggregation level and an amount of candidate sets for transmitting the DCI may be fixed values or may be determined according to a second parameter. The second parameter may include at least one of a subframe type, a Cyclic Prefix (CP) type, a system bandwidth, a DCI format, an amount of available Resource Elements (RE) in a PRB pair, a number of PRB pairs configured for transmitting the DCI, a User Equipment (UE) type, and a component carrier type.

The fixed values may be of one or two kinds.

The aggregation level for transmitting the DCI may be determined according to the second parameter by:

determining, according to a system bandwidth of a small bandwidth or of a large bandwidth, the aggregation level for transmitting the DCI;

and/or determining, according to a subframe type of a general subframe or of a Multicast/Broadcast over Single Frequency Network (MBSFN) subframe, the aggregation level for transmitting the DCI;

and/or determining, according to a subframe type of a general subframe or of a Time Division Duplex (TDD) special subframe, the aggregation level for transmitting the DCI;

and/or determining, according to a UE type of a Long Term Evolution (LTE) UE or of a low cost UE, the aggregation level for transmitting the DCI;

and/or determining, according to a component carrier type of a routine component carrier or of a new-type component carrier, the aggregation level for transmitting the DCI;

and/or determining the aggregration level according to the DCI format;

and/or determining whether the amount of available REs in a PRB pair is greater than a threshold X;

and/or determining whether the number of PRB pairs configured for transmitting the DCI is greater than a threshold N.

The method may further include:

determining a Physical Downlink Shared Channel (PDSCH) transmission mode corresponding to the DCI as a PDSCH transmission mode fixedly based on a DeModulation Reference Signal (DMRS) time-frequency position;

and/or determining a PDSCH transmission mode corresponding to the DCI according to a subframe type of a general subframe or of a Multicast/Broadcast over Single Frequency Network (MBSFN) subframe;

and/or determining a PDSCH transmission mode corresponding to the DCI according to a subframe type of a general subframe or of a Time Division Duplex (TDD) special subframe;

and/or determining a PDSCH transmission mode corresponding to the DCI according to a UE type of a general UE or of a low cost UE;

and/or determining a PDSCH transmission mode corresponding to the DCI according to a component carrier type of a routine component carrier or of a new-type component carrier.

The method may further include: determining an antenna port used in the PDSCH transmission mode as a fixed port or according to at least one of a Physical Cell ID (PCI), a subframe index, the subframe type, a Cyclic Prefix (CP) type, the UE type, a DCI signaling, and the component carrier type.

The method may further include: determining an enhanced Physical Downlink Control Channel (ePDCCH) transmission mode corresponding to the DCI as distributed mapping or centralized mapping; and determining a DMRS port as a fixed port or dynamically selecting a DMRS port according to at least one of the PCI, the subframe index, the subframe type, the CP type, the UE type, and the component carrier type.

According to an embodiment herein, a base station includes a first determining module and an information transmitting module.

The first determining module is configured for: determining positions of a DCI-bearing enhanced search space in a time domain and a frequency domain.

The information transmitting module is configured for: transmitting DCI at the positions of the enhanced search space in the time domain and the frequency domain as determined by the first determining module.

The first determining module may be configured for: predefining the positions of the DCI-bearing enhanced search space in the time domain and the frequency domain, or determining, according to a first parameter, the positions of the enhanced search space in the time domain and the frequency domain. The first parameter may be at least one of: a subframe type, a Cyclic Prefix (CP) type, a system bandwidth, a time-frequency position indicating signaling, a User Equipment (UE) to type, and a component carrier type.

The first determining module may be configured for: predefining, in the time domain, the position of the DCI-bearing enhanced search space in the time domain as a position other than any Orthogonal Frequency Division Multiplexing (OFDM) symbol position occupied by a Physical Downlink Control Channel (PDCCH) in any subframe or in a subframe other than subframes 0 and 5, or as starting from an OFDM symbol starting position in any subframe or in a subframe other than subframes 0 and 5.

The first determining module may be configured for: predefining, in the frequency domain, the position of the DCI-bearing enhanced search space in the frequency domain as 2*N Physical Resource Block (PRB) pairs of two sidebands in the frequency domain, or N PRB pairs mapped with equal intervals, or N discrete PRB pairs around a center frequency corresponding to a 1.4 MHz bandwidth, or N fixed successive PRB pairs around a center frequency corresponding to a 1.4 MHz bandwidth, or top N PRB pairs according to PRB numbering, the N being a natural number.

The first determining module may be configured for: determining the positions of the enhanced search space in the time domain and the frequency domain according to an Orthogonal Frequency Division Multiplexing (OFDM) symbol starting position in case of a small bandwidth and an OFDM symbol starting position in case of a large bandwidth;

or determining, according to an Orthogonal Frequency Division Multiplexing (OFDM) symbol starting position in a general subframe or an OFDM symbol starting position in a Multicast/Broadcast over Single Frequency Network (MBSFN) subframe, the positions of the enhanced search space in the time domain and the frequency domain;

or determining, according to an OFDM symbol starting position in a general subframe or an OFDM symbol starting position in a Time Division Duplex (TDD) special subframe, the positions of the enhanced search space in the time domain and the frequency domain;

or determining, according to an OFDM symbol starting position of a general UE or an OFDM symbol starting position of a low cost UE, the positions of the enhanced search space in the time domain and the frequency domain;

or determining, according to an Orthogonal Frequency Division Multiplexing (OFDM) symbol starting position of a routine component carrier or an OFDM symbol starting position of a new-type component carrier, the positions of the enhanced search space in the time domain and the frequency domain;

or determining, according to time-frequency position indicating signaling carried by a Physical Broadcast Channel (PBCH), the positions of the enhanced search space in the time domain and the frequency domain.

The first determining module may be configured for: when the enhanced search space is an enhanced user-specific search space, before receiving radio resource control (RRC) signaling, predefining the positions of the enhanced user-specific search space in the time domain and the frequency domain, and after receiving the RRC signaling, determining, according to the RRC signaling, the positions of the enhanced user-specific search space in the time domain and the frequency domain.

An aggregation level and an amount of candidate sets for transmitting the DCI by the information transmitting module may be fixed values or may be determined according to a second parameter. The second parameter may include at least one of a subframe type, a Cyclic Prefix (CP) type, a system bandwidth, a DCI format, an amount of available Resource Elements (RE) in a PRB pair, a number of PRB pairs configured for transmitting the DCI, a User Equipment (UE) type, and a component carrier type.

The information transmitting module may be configured for:

determining, according to a system bandwidth of a small bandwidth or of a large bandwidth, the aggregation level for transmitting the DCI;

and/or determining, according to a subframe type of a general subframe or of a Multicast/Broadcast over Single Frequency Network (MBSFN) subframe, the aggregation level for transmitting the DCI;

and/or determining, according to a subframe type of a general subframe or of a Time Division Duplex (TDD) special subframe, the aggregation level for transmitting the DCI;

and/or determining, according to a UE type of a Long Term Evolution (LTE) UE or of a low cost UE, the aggregation level for transmitting the DCI;

and/or determining, according to a component carrier type of a routine component carrier or of a new-type component carrier, the aggregation level for transmitting the DCI;

and/or determining the aggregation level according to the DCI format;

and/or determining whether the amount of available REs in a PRB pair is greater than a threshold X;

and/or determining whether the number of PRB pairs configured for transmitting the DCI is greater than a threshold N.

The information transmitting module may be further configured for:

determining a Physical Downlink Shared Channel (PDSCH) transmission mode corresponding to the DCI as a PDSCH transmission mode fixedly based on a DeModulation Reference Signal (DMRS) time-frequency position;

and/or determining a PDSCH transmission mode corresponding to the DCI according to a subframe type of a general subframe or of a Multicast/Broadcast over Single Frequency Network (MBSFN) subframe;

and/or determining a PDSCH transmission mode corresponding to the DCI according to a subframe type of a general subframe or of a Time Division Duplex (TDD) special subframe;

and/or determining a PDSCH transmission mode corresponding to the DCI according to a UE type of a Long Term Evolution (LTE) UE or of a low cost UE;

and/or determining a PDSCH transmission mode corresponding to the DCI according to a component carrier type of a routine component carrier or of a new-type component carrier.

The information transmitting module may be further configured for determining an antenna port used in the PDSCH transmission mode as a fixed port or according to at least one of a Physical Cell ID (PCI), a subframe index, the subframe type, a Cyclic Prefix (CP) type, the UE type, a DCI signaling, and the component carrier.

The information transmitting module may be further configured for adopting an enhanced Physical Downlink Control Channel (ePDCCH) transmission mode of distributed mapping or centralized mapping; and determining a DMRS port as a fixed port or dynamically selecting a DMRS port according to at least one of the PCI, the subframe index, the subframe type, the CP type, the UE type, and the component carrier type.

According to an embodiment herein, a method for receiving Downlink Control Information (DCI) includes:

determining, by a User Equipment (UE), positions of a DCI-bearing enhanced search space in a time domain and a frequency domain; and receiving DCI at the positions of the enhanced search space in the time domain and the frequency domain.

The determining, by a UE, positions of a DCI-bearing enhanced search space in a time domain and a frequency domain may include: determining, by the UE, the positions of the DCI-bearing enhanced search space in the time domain and the frequency domain in the same way as a base station does, by predefining the positions of the DCI-bearing enhanced search space in the time domain and the frequency domain, or determining, according to a first parameter, the positions of the enhanced search space in the time domain and the frequency domain. The first parameter may be at least one of: a subframe type, a Cyclic Prefix (CP) type, a system bandwidth, a time-frequency position indicating signaling, a User Equipment (UE) type, and a component carrier type.

The predefining the positions of the DCI-bearing enhanced search space in the time domain may include: predefining, by the UE in the time domain, the position of the DCI-bearing enhanced search space in the time domain as a position other than any Orthogonal Frequency Division Multiplexing (OFDM) symbol position occupied by a Physical Downlink Control Channel (PDCCH) in any subframe or in a subframe other than subframes 0 and 5, or as starting from an OFDM symbol starting position in any subframe or in a subframe other than subframes 0 and 5.

The predefining the positions of the DCI-bearing enhanced search space in the frequency domain may include: predefining, by the UE in the frequency domain, the position of the DCI-bearing enhanced search space in the frequency domain as 2*N Physical Resource Block (PRB) pairs of two sidebands in the frequency domain, or N PRB pairs mapped with equal intervals, or N discrete PRB pairs around a center to frequency corresponding to a 1.4 MHz bandwidth, or N fixed successive PRB pairs around a center frequency corresponding to a 1.4 MHz bandwidth, or top N PRB pairs according to PRB numbering, the N being a natural number.

The determining, according to a first parameter, the positions of the enhanced search space in the time domain and the frequency domain may include:

determining, by the UE, the positions of the enhanced search space in the time domain and the frequency domain according to an Orthogonal Frequency Division Multiplexing (OFDM) symbol starting position in case of a small bandwidth and an OFDM symbol starting position in case of a large bandwidth, the small bandwidth referring to the system bandwidth less than or equal to k PRBs, the large bandwidth referring to the system bandwidth greater than or equal to h PRBs, the k, h being natural numbers;

or determining, by the UE according to an Orthogonal Frequency Division Multiplexing (OFDM) symbol starting position in a general subframe and an OFDM symbol starting position in a Multicast/Broadcast over Single Frequency Network (MBSFN) subframe, the positions of the enhanced search space in the time domain and the frequency domain;

or determining, by the UE according to an Orthogonal Frequency Division Multiplexing (OFDM) symbol starting position in a general subframe and an OFDM symbol starting position in a Time Division Duplex (TDD) special subframe, the positions of the enhanced search space in the time domain and the frequency domain;

or determining, by the UE according to an Orthogonal Frequency Division Multiplexing (OFDM) symbol starting position of a Long Term Evolution (LTE) UE and an OFDM symbol starting position of a low cost UE, the positions of the enhanced search space in the time domain and the frequency domain;

or determining, by the UE according to an Orthogonal Frequency Division Multiplexing (OFDM) symbol starting position of a routine component carrier and an OFDM symbol starting position of a new-type component carrier, the positions of the enhanced search space in the time domain and the frequency domain;

or determining, by the UE according to time-frequency position indicating signaling carried by a Physical Broadcast Channel (PBCH), the positions of the to enhanced search space in the time domain and the frequency domain.

The enhanced search space may be an enhanced common search space or an enhanced user-specific search space.

When the enhanced search space is an enhanced user-specific search space, before receiving radio resource control (RRC) signaling, the UE may predefine the positions of the enhanced user-specific search space in the time domain and the frequency domain, and after receiving the RRC signaling, determine, according to the RRC signaling, the positions of the enhanced user-specific search space in the time domain and the frequency domain.

The receiving DCI at the positions of the enhanced search space in the time domain and the frequency domain may include: determining, by the UE, a Physical Downlink Shared Channel (PDSCH) transmission mode corresponding to the DCI, an antenna port used in the PDSCH transmission mode, and an aggregation level and an amount of candidate sets for transmitting the DCI in the same way as a base station does; detecting an enhanced Physical Downlink Control Channel (ePDCCH) transmission mode corresponding to the DCI; and receiving the DCI in accordance with the PDSCH transmission mode, the antenna port used in the PDSCH transmission mode, the aggregation level and the amount of candidate sets as determined, and the detected ePDCCH transmission mode.

The DCI may be borne in the enhanced common search space or the enhanced user-specific search space.

The DCI borne in the enhanced user-specific search space may be user-specific information and common information, or may be user-specific information.

An aggregation level and an amount of candidate sets for transmitting the DCI may be fixed values or may be determined according to a second parameter. The second parameter may include at least one of a subframe type, a Cyclic Prefix (CP) type, a system bandwidth, a DCI format, an amount of available Resource Elements (RE) in a PRB pair, a number of PRB pairs configured for transmitting the DCI, a User Equipment (UE) type, and a component carrier type.

The fixed values may be of one or two kinds.

The aggregation level for transmitting the DCI may be determined according to the second parameter by:

determining, according to a system bandwidth of a small bandwidth or of a large bandwidth, the aggregation level for transmitting the DCI;

and/or determining, according to a subframe type of a general subframe or of a Multicast/Broadcast over Single Frequency Network (MBSFN) subframe, the aggregration level for transmitting the DCI;

and/or determining, according to a subframe type of a general subframe or of a Time Division Duplex (TDD) special subframe, the aggregation level for transmitting the DCI;

and/or determining, according to a UE type of a Long Term Evolution (LTE) UE or of a low cost UE, the aggregration level for transmitting the DCI;

and/or determining, according to a component carrier type of a routine component carrier or of a new-type component carrier, the aggregation level for transmitting the DCI;

and/or determining the aggregation level according to the DCI format;

and/or determining whether the amount of available REs in a PRB pair is greater than a threshold X;

and/or determining whether the number of PRB pairs configured for transmitting the DCI is greater than a threshold N.

The method may further include:

determining a Physical Downlink Shared Channel (PDSCH) transmission mode corresponding to the DCI as a PDSCH transmission mode fixedly based on a DeModulation Reference Signal (DMRS) time-frequency position;

and/or determining a PDSCH transmission mode corresponding to the DCI according to a subframe type of a general subframe or of a Multicast/Broadcast over Single Frequency Network (MBSFN) subframe;

and/or determining a PDSCH transmission mode corresponding to the DCI according to a subframe type of a general subframe or of a Time Division Duplex (TDD) special subframe;

and/or determining a PDSCH transmission mode corresponding to the DCI according to a UE type of a general UE or of a low cost UE;

and/or determining a PDSCH transmission mode corresponding to the DCI according to a component carrier type of a routine component carrier or of a new-type component carrier.

The method may further include: determining an antenna port used in the PDSCH transmission mode as a fixed port or according to at least one of a Physical Cell ID (PCI), a subframe index, the subframe type, a Cyclic Prefix (CP) type, the UE type, a DCI signaling, and the component carrier type.

The method may further include: determining an enhanced Physical Downlink Control Channel (ePDCCH) transmission mode corresponding to the DCI as distributed mapping or centralized mapping; and determining a DMRS port as a fixed port or dynamically selecting a DMRS port according to at least one of the PCI, the subframe index, the subframe type, the CP type, the UE type, and the component carrier type.

According to an embodiment herein, a User Equipment (UE) includes a second determining module and an information receiving module.

The second determining module may be configured for: determining positions of a DCI-bearing enhanced search space in a time domain and a frequency domain.

The information receiving module may be configured for: receiving DCI at the positions of the enhanced search space in the time domain and the frequency domain as determined by the second determining module.

The second determining module may be configured for: determining the positions of the DCI-bearing enhanced search space in the time domain and the frequency domain in the same way as a base station does, by predefining the positions of the DCI-bearing enhanced search space in the time domain and the frequency domain, or determining, according to a first parameter, the positions of the enhanced search space in the time domain and the frequency domain. The first parameter may be at least one of: a subframe type, a Cyclic Prefix (CP) type, a system bandwidth, a time-frequency position indicating signaling, a User Equipment (UE) type, and a component carrier type.

The second determining module may be configured for: predefining, in the time domain, the position of the DCI-bearing enhanced search space in the time domain as a position other than any Orthogonal Frequency Division Multiplexing (OFDM) symbol position occupied by a Physical Downlink Control Channel (PDCCH) in any subframe or in a subframe other than subframes 0 and 5, or as starting from an OFDM symbol starting position in any subframe or in a subframe other than subframes 0 and 5.

The second determining module may be further configured for predefining, in the frequency domain, the position of the DCI-bearing enhanced search space in the frequency domain as 2*N Physical Resource Block (PRB) pairs of two sidebands in the frequency domain, or N PRB pairs mapped with equal intervals, or N discrete PRB pairs around a center frequency corresponding to a 1.4 MHz bandwidth, or N fixed successive PRB pairs around a center frequency corresponding to a 1.4 MHz bandwidth, or top N PRB pairs according to PRB numbering, the N being a natural number.

The second determining module may be further configured for:

determining the positions of the enhanced search space in the time domain and the frequency domain according to an Orthogonal Frequency Division Multiplexing (OFDM) symbol starting position in case of a small bandwidth and an OFDM symbol starting position in case of a large bandwidth, the small bandwidth referring to the system bandwidth less than or equal to k PRBs, the large bandwidth referring to the system bandwidth greater than or equal to h PRBs, the k, h being natural numbers;

or determining, according to an Orthogonal Frequency Division Multiplexing (OFDM) symbol starting position in a general subframe and an OFDM symbol starting position in a Multicast/Broadcast over Single Frequency Network (MBSFN) subframe, the positions of the enhanced search space in the time domain and the frequency domain;

or determining, according to an Orthogonal Frequency Division Multiplexing (OFDM) symbol starting position in a general subframe and an OFDM symbol starting position in a Time Division Duplex (TDD) special subframe, the positions of the enhanced search space in the time domain and the frequency domain;

or determining, according to an Orthogonal Frequency Division Multiplexing (OFDM) symbol starting position of a Long Term Evolution (LTE) UE and an OFDM symbol starting position of a low cost UE, the positions of the enhanced search space in the time domain and the frequency domain;

or determining, according to an Orthogonal Frequency Division Multiplexing (OFDM) symbol starting position of a routine component carrier and an OFDM symbol starting position of a new-type component carrier, the positions of the enhanced search space in the time domain and the frequency domain;

or determining, according to time-frequency position indicating signaling carried by a Physical Broadcast Channel (PBCH), the positions of the enhanced search space in the time domain and the frequency domain.

The enhanced search space may be an enhanced common search space or an enhanced user-specific search space.

The second determining module may be further configured for: when the enhanced search space is an enhanced user-specific search space, before receiving radio resource control (RRC) signaling, predefining the positions of the enhanced user-specific search space in the time domain and the frequency domain, and after receiving the RRC signaling, determining, according to the RRC signaling, the positions of the enhanced user-specific search space in the time domain and the frequency domain.

The information receiving module may be configured for: determining, in the same way as a base station does, a Physical Downlink Shared Channel (PDSCH) transmission mode corresponding to the DCI, an antenna port used in the PDSCH transmission mode, and an aggregation level and an amount of candidate sets for transmitting the DCI; detecting an enhanced Physical Downlink Control Channel (ePDCCH) transmission mode corresponding to the DCI; and receiving the DCI in accordance with the PDSCH transmission mode, the antenna port used in the PDSCH transmission mode, the aggregation level and the amount of candidate sets as determined, and the detected ePDCCH transmission mode.

The information receiving module may be further configured for:

determining, according to a system bandwidth of a small bandwidth or of a large bandwidth, the aggregation level for transmitting the DCI;

and/or determining, according to a subframe type of a general subframe or of a Multicast/Broadcast over Single Frequency Network (MBSFN) subframe, the aggregation level for transmitting the DCI;

and/or determining, according to a subframe type of a general subframe or of a Time Division Duplex (TDD) special subframe, the aggregation level for transmitting the DCI;

and/or determining, according to a UE type of a Long Term Evolution (LTE) UE or of a low cost UE, the aggregation level for transmitting the DCI;

and/or determining, according to a component carrier type of a routine component carrier or of a new-type component carrier, the aggregation level for transmitting the DCI;

and/or determining the aggregation level according to the DCI format;

and/or determining whether the amount of available REs in a PRB pair is greater than a threshold X;

and/or determining whether the number of PRB pairs configured for transmitting the DCI is greater than a threshold N.

The information receiving module may be further configured for:

determining a Physical Downlink Shared Channel (PDSCH) transmission mode corresponding to the DCI as a PDSCH transmission mode fixedly based on a DeModulation Reference Signal (DMRS) time-frequency position;

and/or determining a PDSCH transmission mode corresponding to the DCI according to a subframe type of a general subframe or of a Multicast/Broadcast over Single Frequency Network (MBSFN) subframe;

and/or determining a PDSCH transmission mode corresponding to the DCI according to a subframe type of a general subframe or of a Time Division Duplex (TDD) special subframe;

and/or determining a PDSCH transmission mode corresponding to the DCI according to a UE type of a general UE or of a low cost UE;

and/or determining a PDSCH transmission mode corresponding to the DCI according to a component carrier type of a routine component carrier or of a new-type component carrier.

The information receiving module may be further configured for determining an antenna port used in the PDSCH transmission mode as a fixed port or according to at least one of a Physical Cell ID (PCI), a subframe index, the subframe type, a Cyclic Prefix (CP) type, the UE type, a DCI signaling, and the component carrier type.

The information receiving module may be further configured for receiving the DCI at a DeModulation Reference Signal (DMRS) port according to an enhanced Physical Downlink Control Channel (ePDCCH) transmission mode of distributed mapping or centralized mapping.

With a method and apparatus for transmitting Downlink Control Information (DCI) according to embodiments herein, a base station determines positions of a DCI-bearing enhanced search space in a time domain and a frequency domain; the base station transmits DCI at the positions of the enhanced search space in the time domain and the frequency domain; a UE determines positions of a DCI-bearing enhanced search space in a time domain and a frequency domain; the UE receives DCI at the positions of the enhanced search space in the time domain and the frequency domain. Thus, it is possible to implement DCI transmission through an enhanced search space in both NCT independent operation and access of a large-bandwidth system by a low cost UE when DCI may not be transmitted using a search space of a PDCCH area.

BRIEF DESCRIPTION OF THE DRAWINGS

FIG. 1 is a schematic diagram of a frame structure in an existing FDD system.

FIG. 2 is a schematic diagram of a frame structure in an existing TDD system.

FIG. 3 is a schematic diagram of ePDCCH distribution in an existing subframe.

FIG. 4 is a flowchart of implementing a method for transmitting DCI according to an embodiment herein.

DETAILED DESCRIPTION

According to an embodiment herein, a base station determines positions of a DCI-bearing enhanced search space in a time domain and a frequency domain; the base station transmits DCI at the positions of the enhanced search space in the time domain and the frequency domain; a UE determines positions of a DCI-bearing enhanced search space in a time domain and a frequency domain; the UE receives DCI at the positions of the enhanced search space in the time domain and the frequency domain.

The disclosure is further elaborated below with reference to drawings and embodiments.

A method for transmitting DCI according to an embodiment herein, as shown in FIG. 4, includes steps as follows.

In step 101, a base station determines positions of a DCI-bearing enhanced search space in a time domain and a frequency domain.

The base station may predefine the positions of the DCI-bearing enhanced search space in the time domain and the frequency domain, or determine, according to a first parameter, the positions of the enhanced search space in the time domain and the frequency domain. The first parameter may be at least one of: a subframe type, a Cyclic Prefix (CP) type, a system bandwidth, a time-frequency position indicating signaling, a User Equipment (UE) type, and a component carrier type.

The base station may predefined the position of the DCI-bearing enhanced search space in the time domain by: predefining, in the time domain, the position of the DCI-bearing enhanced search space in the time domain as a position other than any Orthogonal Frequency Division Multiplexing (OFDM) symbol position occupied by a Physical Downlink Control Channel (PDCCH) in any subframe or in a subframe other than subframes 0 and 5, or as starting from an OFDM symbol starting position in any subframe or in a subframe other than subframes 0 and 5.

Figure 5:
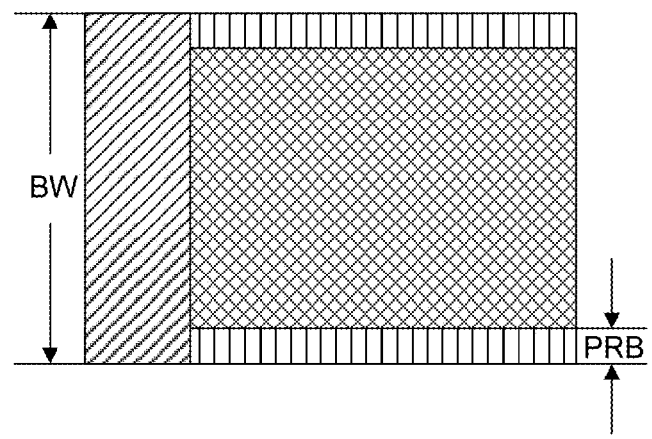
FIG. 5 is a schematic diagram of a configuration of a first enhanced search space in a subframe according to an embodiment herein.
Figure 6:
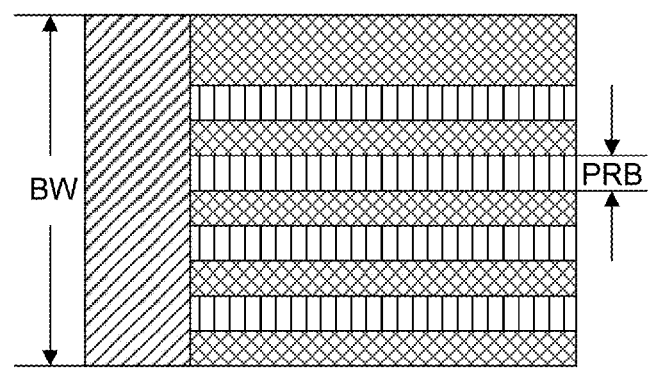
FIG. 6 is a schematic diagram of a configuration of a second enhanced search space in a subframe according to an embodiment herein.
Figure 7:
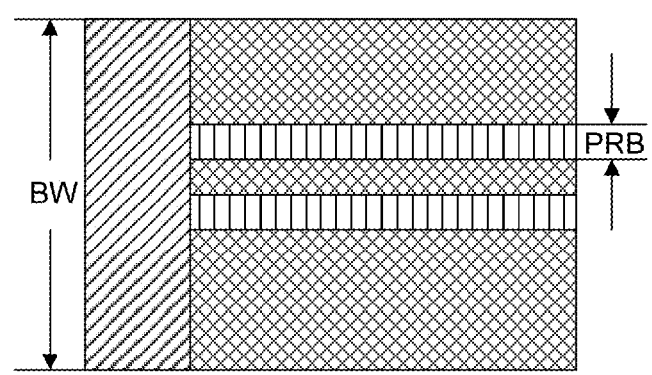
FIG. 7 is a schematic diagram of a configuration of a third enhanced search space in a subframe according to an embodiment herein.
Figure 8:
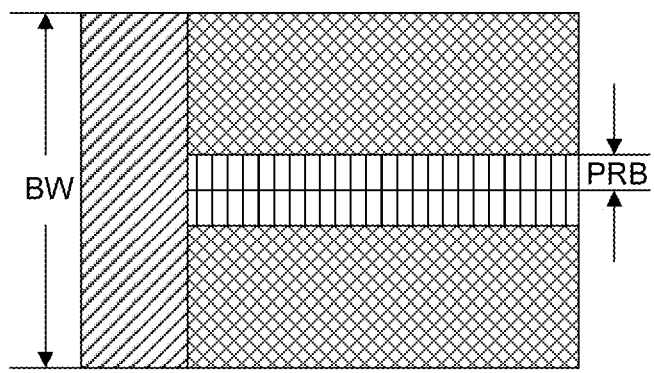
FIG. 8 is a schematic diagram of a configuration of a fourth enhanced search space in a subframe according to an embodiment herein.
Figure 9:
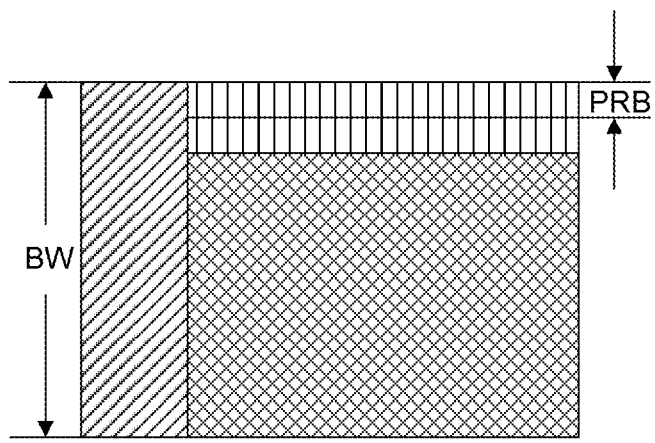
FIG. 9 is a schematic diagram of a configuration of a fifth enhanced search space in a subframe according to an embodiment herein.

The base station may predefine the position of the DCI-bearing enhanced search space in the frequency domain by: predefining, in the frequency domain, the position of the DCI-bearing enhanced search space in the frequency domain as 2*N Physical Resource Block (PRB) pairs of two sidebands in the frequency domain as shown in FIG. 5, or N PRB pairs mapped with equal intervals as shown in FIG. 6, or N discrete PRB pairs around a center frequency corresponding to a 1.4 MHz bandwidth as shown in FIG. 7, or N fixed successive PRB pairs around a center frequency corresponding to a 1.4 MHz bandwidth as shown in FIG. 8, or top N PRB pairs according to PRB numbering as shown in FIG. 9. The N is a natural number, and may be 1 or 2 or 4, or 8 or 16 or 32. In FIG. 5-FIG. 9, a bandwidth is denoted by BW, a hatched portion denotes a PDCCH, the PDCCH occupies 0-4 OFDM symbols, a portion with vertical lines denotes an ePDCCH, a meshed portion denotes a PDSCH.

The base station may determine, according to a first parameter, the positions of the enhanced search space in the time domain and the frequency domain as follows.

The base station may determine the positions of the enhanced search space in the time domain and the frequency domain according to an Orthogonal Frequency Division Multiplexing (OFDM) symbol starting position in case of a small bandwidth and an OFDM symbol starting position in case of a large bandwidth. The small bandwidth refers to the system bandwidth less than or equal to k PRBs. The large bandwidth refers to the system bandwidth greater than or equal to h PRBs. The k is a natural number, and may be 6 or 15 or 25. The h is a natural number, and may be 25 or 50. The OFDM symbol starting position in case of the small bandwidth may be the 4th or the 5th OFDM symbol. The OFDM symbol starting position in case of the large bandwidth may be the 3th or the 4th OFDM symbol.

Alternatively, the base station may determine, according to an Orthogonal Frequency Division Multiplexing (OFDM) symbol starting position in a general subframe and an OFDM symbol starting position in a Multicast/Broadcast over Single Frequency Network (MBSFN) subframe, the positions of the enhanced search space in the time domain and the frequency domain.

Alternatively, the base station may determine, according to an Orthogonal Frequency Division Multiplexing (OFDM) symbol starting position in a general subframe and an OFDM symbol starting position in a Time Division Duplex (TDD) special subframe, the positions of the enhanced search space in the time domain and the frequency domain.

Alternatively, the base station may determine, according to an Orthogonal Frequency Division Multiplexing (OFDM) symbol starting position of a Long Term Evolution (LTE) UE and an OFDM symbol starting position of a low cost UE, the positions of the enhanced search space in the time domain and the frequency domain.

Alternatively, the base station may determine, according to an Orthogonal Frequency Division Multiplexing (OFDM) symbol starting position of a routine component carrier and an OFDM symbol starting position of a new-type component carrier, the positions of the enhanced search space in the time domain and the frequency domain.

Alternatively, the base station may determine, according to time-frequency position indicating signaling carried by a Physical Broadcast Channel (PBCH), the positions of the enhanced search space in the time domain and the frequency domain. The time-frequency position indicating signaling may include at least a parameter of: a subframe numbering, an OFDM starting symbol, a position in the frequency domain, and an N.

The enhanced search space may be an enhanced common search space or an enhanced user-specific search space.

When the enhanced search space is an enhanced user-specific search space, before receiving radio resource control (RRC) signaling, the base station may predefine the positions of the enhanced user-specific search space in the time domain and the frequency domain. The enhanced user-specific search space may be referred to as a second enhanced common search space. After receiving the RRC signaling, the base station may determine, according to the RRC signaling, the positions of the enhanced user-specific search space in the time domain and the frequency domain.

Parameter configuration has to be determined before the step. Such a parameter may include: a subframe type, a Cyclic Prefix (CP) type, a system bandwidth, a DCI format, an amount of available Resource Elements (RE), a number of PRB pairs, time-frequency position indicating signaling, a UE type, etc.

The subframe type may include a general (Normal) subframe and a special subframe.

The CP type may include a general normal Cyclic Prefix and an extended Cyclic Prefix.

The system bandwidth may include: 1.4 MHz, 3 MHz, 5 MHz, 10 MHz, 20 MHz.

The DCI format may include: Format 0, Format 1, Format 1A, Format 1B, Format 1C, Format 1D, Format 2, Format 2A, Format 2B, Format 2C, Format 3, Format 3A, Format 4.

The amount of available REs may refer to a number of REs available to a PDSCH in a PRB pair.

The number of PRB pairs may be N, N being a natural number.

The time-frequency position indicating signaling may refer to a PBCH-borne MIB message.

The UE type may be an LTE UE or a low cost UE.

A carrier type may include a routine component carrier (also known as a compatible component carrier) and a new-type component carrier.

In step 102, the base station transmits DCI at the positions of the enhanced search space in the time domain and the frequency domain.

The DCI may be borne in the enhanced common search space or the enhanced user-specific search space.

The DCI borne in the enhanced user-specific search space may be user-specific information and common information, or may be user-specific information. A control information format, an aggregration level, a candidate set, and a transmission mode for the user-specific information and the common information may be configured independently.

An aggregation level and an amount of candidate sets for transmitting the DCI may be fixed values or may be determined according to a second parameter. The second parameter may include one or more of a subframe type, a Cyclic Prefix (CP) type, a system bandwidth, a DCI format, an amount of available Resource Elements (RE) in a PRB pair, a number of PRB pairs configured for transmitting the DCI, a User Equipment (UE) type, and a component carrier type.

The fixed values may be of one or two kinds.

When the fixed values are of one kind, an aggregation level may be 2, 4, 8, 16, 32, the amount of candidate sets may be 8, 6, 4, 2. When the fixed values are of two kinds, an aggregation level may be 8 and 16 or 4 and 8, the amount of candidate sets may be 4 and 2 or 2 and 1.

The aggregation level for transmitting the DCI may be determined according to the second parameter, specifically by:

determining, according to a system bandwidth of a small bandwidth or of a large bandwidth, the aggregation level for transmitting the DCI;

and/or determining, according to a subframe type of a general subframe or of a Multicast/Broadcast over Single Frequency Network (MBSFN) subframe, the aggregration level for transmitting the DCI;

and/or determining, according to a subframe type of a general subframe or of a Time Division Duplex (TDD) special subframe, the aggregation level for transmitting the DCI;

and/or determining, according to a UE type of a Long Term Evolution (LTE) UE or of a low cost UE, the aggregration level for transmitting the DCI;

and/or determining, according to a component carrier type of a routine component carrier or of a new-type component carrier, the aggregation level for transmitting the DCI;

and/or determining the aggregation level according to the DCI format;

and/or determining whether the amount of available REs in a PRB pair is greater than a threshold X, where the X may be 104;

and/or determining whether the number of PRB pairs configured for transmitting the DCI is greater than a threshold N. The N may be 1, 2, 4, 8.

A Physical Downlink Shared Channel (PDSCH) transmission mode corresponding to the DCI may be determined specifically as a PDSCH transmission mode fixedly based on a DeModulation Reference Signal (DMRS) time-frequency position. A time-frequency position in such a transmission mode is the same as an existing DMRS, though with different port number definitions.

Alternatively, a PDSCH transmission mode corresponding to the DCI may be determined: according to a subframe type of a general subframe or of a Multicast/Broadcast over Single Frequency Network (MBSFN) subframe;

and/or according to a subframe type of a general subframe or of a Time Division Duplex (TDD) special subframe;

and/or according to a UE type of a general UE or of a low cost UE;

and/or according to a component carrier type of a routine component carrier or of a new-type component carrier.

An antenna port used in the PDSCH transmission mode may be determined as a fixed port or according to at least one of a Physical Cell ID (PCI), a subframe index, the subframe type, a Cyclic Prefix (CP) type, the UE type, a DCI signaling, and the component carrier type.

An enhanced Physical Downlink Control Channel (ePDCCH) transmission mode corresponding to the DCI may be distributed mapping or centralized mapping. A DMRS port may be determined as a fixed port or dynamically selected according to at least one of the PCI, the subframe index, the subframe type, the CP type, the UE type, and the component carrier type. The fixed port may be consistent with an eREG port in a D-eCCE.

Figure 10:
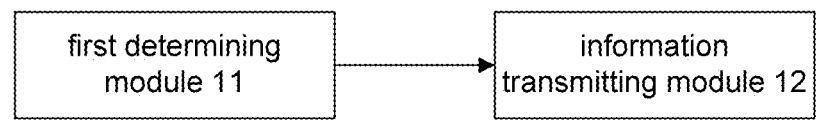
FIG. 10 is a schematic diagram of a structure of a base station according to an embodiment herein.

In order to implement the method, an embodiment herein further provides a base station. As shown in FIG. 10, the base station includes a first determining module 11 and an information transmitting module 12.

The first determining module 11 may be configured for: determining positions of a DCI-bearing enhanced search space in a time domain and a frequency domain.

The information transmitting module 12 may be configured for: transmitting DCI at the positions of the enhanced search space in the time domain and the frequency domain.

In a practical application, the first determining module 11 may be implemented by a baseband controller of the base station, the information transmitting module 12 may be implemented by a modem of the base station.

The first determining module 11 may be configured for predefining the positions of the DCI-bearing enhanced search space in the time domain and the frequency domain, or determining, according to a first parameter, the positions of the enhanced search space in the time domain and the frequency domain. The first parameter may be at least one of: a subframe type, a Cyclic Prefix (CP) type, a system bandwidth, a time-frequency position indicating signaling, a User Equipment (UE) type, and a component carrier type.

The first determining module 11 may be configured for predefining, in the time domain, the position of the DCI-bearing enhanced search space in the time domain as a position other than any Orthogonal Frequency Division Multiplexing (OFDM) symbol position occupied by a Physical Downlink Control Channel (PDCCH) in any subframe or in a subframe other than subframes 0 and 5, or as starting from an OFDM symbol starting position in any subframe or in a subframe other than subframes 0 and 5.

The first determining module 11 may be configured for predefining, in the frequency domain, the position of the DCI-bearing enhanced search space in the frequency domain as 2*N Physical Resource Block (PRB) pairs of two sidebands in the frequency domain, or N PRB pairs mapped with equal intervals, or N discrete PRB pairs around a center frequency corresponding to a 1.4 MHz bandwidth, or N fixed successive PRB pairs around a center frequency corresponding to a 1.4 MHz bandwidth, or top N PRB pairs according to PRB numbering. The N is a natural number, and may be 1 or 2 or 4, or 8 or 16 or 32.

The first determining module 11 may be configured for:

determining the positions of the enhanced search space in the time domain and the frequency domain according to an Orthogonal Frequency Division Multiplexing (OFDM) symbol starting position in case of a small bandwidth and an OFDM symbol starting position in case of a large bandwidth, the small bandwidth referring to the system bandwidth less than or equal to k PRBs, the large bandwidth referring to the system bandwidth greater than or equal to h PRBs;

or determining, according to an Orthogonal Frequency Division Multiplexing (OFDM) symbol starting position in a general subframe or an OFDM symbol starting position in a Multicast/Broadcast over Single Frequency Network (MBSFN) subframe, the positions of the enhanced search space in the time domain and the frequency domain;

or determining, according to an OFDM symbol starting position in a general subframe or an OFDM symbol starting position in a Time Division Duplex (TDD) special subframe, the positions of the enhanced search space in the time domain and the frequency domain;

or determining, according to an OFDM symbol starting position of a general UE or an OFDM symbol starting position of a low cost UE, the positions of the enhanced search space in the time domain and the frequency domain;

or determining, according to an Orthogonal Frequency Division Multiplexing (OFDM) symbol starting position of a routine component carrier (also known as a compatible component carrier) or an OFDM symbol starting position of a new-type component carrier, the positions of the enhanced search space in the time domain and the frequency domain;

or determining, according to time-frequency position indicating signaling carried by a Physical Broadcast Channel (PBCH), the positions of the enhanced search space in the time domain and the frequency domain. The time-frequency position indicating signaling may include at least a parameter of: a subframe numbering, an OFDM starting symbol, a position in the frequency domain, and an N.

The enhanced search space may be an enhanced common search space or an enhanced user-specific search space.

The first determining module 11 may be configured for: when the enhanced search space is an enhanced user-specific search space, before receiving radio resource control (RRC) signaling, predefining the positions of the enhanced user-specific search space in the time domain and the frequency domain (where the enhanced user-specific search space may be referred to as a second enhanced common search space), and after receiving the RRC signaling, determining, according to the RRC signaling, the positions of the enhanced user-specific search space in the time domain and the frequency domain.

The DCI may be borne in the enhanced common search space or the enhanced user-specific search space.

The DCI borne in the enhanced user-specific search space may be user-specific information and common information, or may be user-specific information. A control information format, an aggregation level, a candidate set, and a transmission mode for the user-specific information and the common information may be configured independently.

An aggregation level and an amount of candidate sets for transmitting the DCI by the information transmitting module 11 may be fixed values or may be determined according to a second parameter. The second parameter may include one or more of a subframe type, a Cyclic Prefix (CP) type, a system bandwidth, a DCI format, an amount of available Resource Elements (RE) in a PRB pair, a number of PRB pairs configured for transmitting the DCI, a User Equipment (UE) type, and a component carrier type.

The fixed values may be of one or two kinds.

When the fixed values are of one kind, an aggregation level may be 2, 4, 8, 16, 32, the amount of candidate sets may be 8, 6, 4, 2. When the fixed values are of two kinds, an aggregation level may be 8 and 16 or 4 and 8, the amount of candidate sets may be 4 and 2 or 2 and 1.

The information transmitting module 12 may be configured for:

determining, according to a system bandwidth of a small bandwidth or of a large bandwidth, the aggregation level for transmitting the DCI;

and/or determining, according to a subframe type of a general subframe or of a Multicast/Broadcast over Single Frequency Network (MBSFN) subframe, the aggregration level for transmitting the DCI;

and/or determining, according to a subframe type of a general subframe or of a Time Division Duplex (TDD) special subframe, the aggregation level for transmitting the DCI;

and/or determining, according to a UE type of a Long Term Evolution (LTE) UE or of a low cost UE, the aggregration level for transmitting the DCI;

and/or determining, according to a component carrier type of a routine component carrier or of a new-type component carrier, the aggregation level for transmitting the DCI;

and/or determining the aggregration level according to the DCI format;

and/or determining whether the amount of available REs in a PRB pair is greater than a threshold X, where the X may be 104;

and/or determining whether the number of PRB pairs configured for transmitting the DCI is greater than a threshold N. The N may be 1, 2, 4, 8.

The information transmitting module 12 may be further configured for:

determining a Physical Downlink Shared Channel (PDSCH) transmission mode corresponding to the DCI as a PDSCH transmission mode fixedly based on a DeModulation Reference Signal (DMRS) time-frequency position, where a time-frequency position in such a transmission mode is the same as an existing DMRS, though with different port number definitions;

and/or determining a PDSCH transmission mode corresponding to the DCI according to a subframe type of a general subframe or of a Multicast/Broadcast over Single Frequency Network (MBSFN) subframe;

and/or determining a PDSCH transmission mode corresponding to the DCI according to a subframe type of a general subframe or of a Time Division Duplex (TDD) special subframe;

and/or determining, according to a UE type of an LTE UE or of a low cost UE, a PDSCH transmission mode corresponding to the DCI;

and/or determining a PDSCH transmission mode corresponding to the DCI according to a component carrier type of a routine component carrier or of a new-type component carrier.

The information transmitting module 12 may be further configured for determining an antenna port used in the PDSCH transmission mode as a fixed port or according to at least one of a Physical Cell ID (PCI), a subframe index, the subframe type, a Cyclic Prefix (CP) type, the UE type, a DCI signaling, and the component carrier.

The information transmitting module 12 may be further configured for adopting an enhanced Physical Downlink Control Channel (ePDCCH) transmission mode of distributed mapping or centralized mapping; and determining a DMRS port as a fixed port or dynamically selecting a DMRS port according to at least one of the PCI, the subframe index, the subframe type, the CP type, the UE type, and the component carrier type. The fixed port may include a DMRS port consistent with an eREG port in a D-eCCE.

Figure 11:
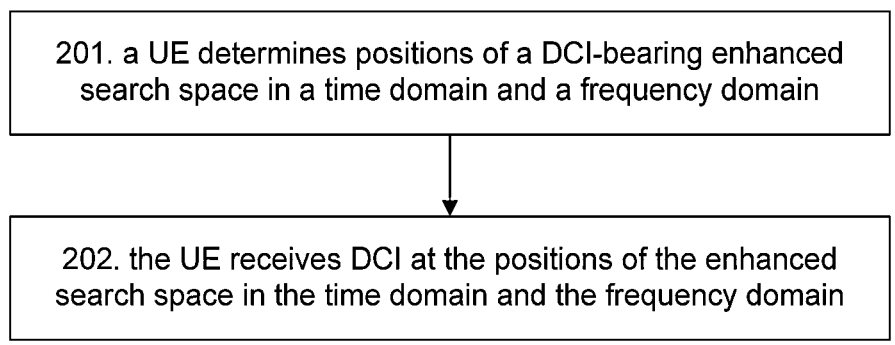
FIG. 11 is a flowchart of a method for receiving DCI according to an embodiment herein.

An embodiment herein further provides a method for receiving Downlink Control Information (DCI). As shown in FIG. 11, the method includes steps as follows.

In step 201, a UE determines positions of a DCI-bearing enhanced search space in a time domain and a frequency domain.

The UE may determine the positions of the DCI-bearing enhanced search space in the time domain and the frequency domain in the same way as a base station does, by predefining the positions of the DCI-bearing enhanced search space in the time domain and the frequency domain, or determining, according to a first parameter, the positions of the enhanced search space in the time domain and the frequency domain. The first parameter may be at least one of: a subframe type, a Cyclic Prefix (CP) type, a system bandwidth, a time-frequency position indicating signaling, a User Equipment (UE) type, and a component carrier type.

The UE may predefine the positions of the DCI-bearing enhanced search space in the time domain by predefining, in the time domain, the position of the DCI-bearing enhanced search space in the time domain as a position other than any Orthogonal Frequency Division Multiplexing (OFDM) symbol position occupied by a Physical Downlink Control Channel (PDCCH) in any subframe or in a subframe other than subframes 0 and 5, or as starting from an OFDM symbol starting position in any subframe or in a subframe other than subframes 0 and 5.

The UE may predefine the positions of the DCI-bearing enhanced search space in the frequency domain by predefining, in the frequency domain, the position of the DCI-bearing enhanced search space in the frequency domain as 2*N Physical Resource Block (PRB) pairs of two sidebands in the frequency domain, or N PRB pairs mapped with equal intervals, or N discrete PRB pairs around a center frequency to corresponding to a 1.4 MHz bandwidth, or N fixed successive PRB pairs around a center frequency corresponding to a 1.4 MHz bandwidth, or top N PRB pairs according to PRB numbering. The N is a natural number, and may be 1 or 2 or 4, or 8 or 16 or 32.

The UE may determine, according to the first parameter, the positions of the enhanced search space in the time domain and the frequency domain as follows.

The UE may determine the positions of the enhanced search space in the time domain and the frequency domain according to an Orthogonal Frequency Division Multiplexing (OFDM) symbol starting position in case of a small bandwidth and an OFDM symbol starting position in case of a large bandwidth. The small bandwidth may refer to the system bandwidth less than or equal to k PRBs. The large bandwidth may refer to the system bandwidth greater than or equal to h PRBs. The k is a natural number, and may be 6 or 15 or 25. The h is a natural number, and may be 25 or 50. The OFDM symbol starting position in case of the small bandwidth may be the 4th or the 5th OFDM symbol. The OFDM symbol starting position in case of the large bandwidth may be the 3th or the 4th OFDM symbol.

Alternatively, the UE may determine, according to an Orthogonal Frequency Division Multiplexing (OFDM) symbol starting position in a general subframe and an OFDM symbol starting position in a Multicast/Broadcast over Single Frequency Network (MBSFN) subframe, the positions of the enhanced search space in the time domain and the frequency domain;

Alternatively, the UE may determine, according to an Orthogonal Frequency Division Multiplexing (OFDM) symbol starting position in a general subframe and an OFDM symbol starting position in a Time Division Duplex (TDD) special subframe, the positions of the enhanced search space in the time domain and the frequency domain;

Alternatively, the UE may determine, according to an Orthogonal Frequency Division Multiplexing (OFDM) symbol starting position of a Long Term Evolution (LTE) UE and an OFDM symbol starting position of a low cost UE, the positions of the enhanced search space in the time domain and the frequency domain;

Alternatively, the UE may determine, according to an Orthogonal Frequency Division Multiplexing (OFDM) symbol starting position of a routine component carrier to and an OFDM symbol starting position of a new-type component carrier, the positions of the enhanced search space in the time domain and the frequency domain;

Alternatively, the UE may determine, according to time-frequency position indicating signaling carried by a Physical Broadcast Channel (PBCH), the positions of the enhanced search space in the time domain and the frequency domain. The time-frequency position indicating signaling may include at least a parameter of: a subframe numbering, an OFDM starting symbol, a position in the frequency domain, and an N.

The enhanced search space may be an enhanced common search space or an enhanced user-specific search space.

When the enhanced search space is an enhanced user-specific search space, before receiving radio resource control (RRC) signaling, the UE may predefine the positions of the enhanced user-specific search space in the time domain and the frequency domain. The enhanced user-specific search space may be referred to as a second enhanced common search space. After receiving the RRC signaling, the UE may determine, according to the RRC signaling, the positions of the enhanced user-specific search space in the time domain and the frequency domain.

Parameter configuration has to be determined beforehand. Such a parameter may include: a subframe type, a Cyclic Prefix (CP) type, a system bandwidth, a DCI format, an amount of available Resource Elements (RE), a number of PRB pairs, time-frequency position indicating signaling, a UE type, etc.

The subframe type may include a general (Normal) subframe and a special subframe.

The CP type may include a general normal Cyclic Prefix and an extended Cyclic Prefix.

The system bandwidth may include: 1.4 MHz, 3 MHz, 5 MHz, 10 MHz, 20 MHz.

The DCI format may include: Format 0, Format 1, Format 1A, Format 1B, Format 1C, Format 1D, Format 2, Format 2A, Format 2B, Format 2C, Format 3, Format 3A, Format 4.

The amount of available REs may refer to a number of REs available to a PDSCH in a PRB pair.

The number of PRB pairs may be N, N being a natural number.

The time-frequency position indicating signaling may refer to a PBCH-borne MIB message.

The UE type may be an LTE UE or a low cost UE.

A carrier type may include a routine component carrier and a new-type component carrier.

In step 202, the UE receives DCI at the positions of the enhanced search space in the time domain and the frequency domain.

The UE may be configured for: determining a Physical Downlink Shared Channel (PDSCH) transmission mode corresponding to the DCI, an antenna port used in the PDSCH transmission mode, and an aggregation level and an amount of candidate sets for transmitting the DCI in the same way as a base station does; detecting an enhanced Physical Downlink Control Channel (ePDCCH) transmission mode corresponding to the DCI; and receiving the DCI in accordance with the PDSCH transmission mode, the antenna port used in the PDSCH transmission mode, the aggregration level and the amount of candidate sets as determined, and the detected ePDCCH transmission mode.

The DCI may be borne in the enhanced common search space or the enhanced user-specific search space.

The DCI borne in the enhanced user-specific search space may be user-specific information and common information, or may be user-specific information only.

An aggregation level and an amount of candidate sets for transmitting the DCI may be fixed values or may be determined according to a second parameter. The second parameter may include one or more of a subframe type, a Cyclic Prefix (CP) type, a system bandwidth, a DCI format, an amount of available Resource Elements (RE) in a PRB pair, a number of PRB pairs configured for transmitting the DCI, a User Equipment (UE) type, and a component carrier type.

The fixed values may be of one or two kinds.

When the fixed values are of one kind, an aggregation level may be 2, 4, 8, 16, 32, the amount of candidate sets may be 8, 6, 4, 2. When the fixed values are of two kinds, an aggregation level may be 8 and 16 or 4 and 8, the amount of candidate sets may be 4 and 2 or 2 and 1.

The aggregation level for transmitting the DCI may be determined according to the second parameter, specifically by:

determining, according to a system bandwidth of a small bandwidth or of a large bandwidth, the aggregation level for transmitting the DCI;

and/or determining, according to a subframe type of a general subframe or of a Multicast/Broadcast over Single Frequency Network (MBSFN) subframe, the aggregration level for transmitting the DCI;

and/or determining, according to a subframe type of a general subframe or of a Time Division Duplex (TDD) special subframe, the aggregation level for transmitting the DCI;

and/or determining, according to a UE type of a Long Term Evolution (LTE) UE or of a low cost UE, the aggregration level for transmitting the DCI;

and/or determining, according to a component carrier type of a routine component carrier or of a new-type component carrier, the aggregation level for transmitting the DCI;

and/or determining the aggregration level according to the DCI format;

and/or determining whether the amount of available REs in a PRB pair is greater than a threshold X, where the X may be 104;

and/or determining whether the number of PRB pairs configured for transmitting the DCI is greater than a threshold N. The N may be 1, 2, 4, 8.

A Physical Downlink Shared Channel (PDSCH) transmission mode corresponding to the DCI may be determined specifically as a PDSCH transmission mode fixedly based on a DeModulation Reference Signal (DMRS) time-frequency position. A time-frequency position in such a transmission mode is the same as an existing DMRS, though with different port number definitions.

Alternatively, a PDSCH transmission mode corresponding to the DCI may be determined: according to a subframe type of a general subframe or of a Multicast/Broadcast over Single Frequency Network (MBSFN) subframe;

and/or according to a subframe type of a general subframe or of a Time Division Duplex (TDD) special subframe;

and/or according to a UE type of a general UE or of a low cost UE;

and/or according to a component carrier type of a routine component carrier or of a new-type component carrier.

An antenna port used in the PDSCH transmission mode may be determined as a fixed port or according to at least one of a Physical Cell ID (PCI), a subframe index, the subframe type, a Cyclic Prefix (CP) type, the UE type, a DCI signaling, and the component carrier type.

Figure 12:
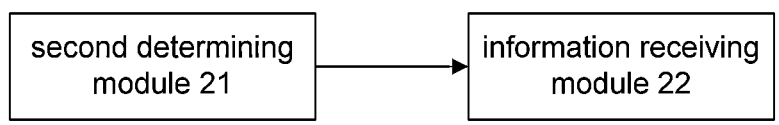
FIG. 12 is a schematic diagram of a structure of a UE according to an embodiment herein.

An enhanced Physical Downlink Control Channel (ePDCCH) transmission mode corresponding to the DCI may be distributed mapping or centralized mapping. A DMRS port may be determined as a fixed port or dynamically selected according to at least one of the PCI, the subframe index, the subframe type, the CP type, the UE type, and the component carrier type. The fixed port may be consistent with an eREG port in a D-eCCE.

based on the method for receiving DCI, an embodiment herein further provides a UE, as shown in FIG. 12, including a second determining module 21 and an information receiving module 22.

The second determining module 21 may be configured for: determining positions of a DCI-bearing enhanced search space in a time domain and a frequency domain.

The information receiving module 22 may be configured for: receiving DCI at the positions of the enhanced search space in the time domain and the frequency domain as determined by the second determining module.

In a practical application, the second determining module 21 may be implemented by a baseband signal processor of the UE, the information receiving module 22 may be implemented by a modem of the UE.

The second determining module 21 may be configured for: determining the positions of the DCI-bearing enhanced search space in the time domain and the frequency domain in the same way as a base station does, by predefining the positions of the DCI-bearing enhanced search space in the time domain and the frequency domain, or determining, according to a first parameter, the positions of the enhanced search space in the time domain and the frequency domain. The first parameter may be at least one of: a subframe type, a Cyclic Prefix (CP) type, a system bandwidth, a time-frequency position indicating signaling, a User Equipment (UE) type, and a component carrier type.

The second determining module 21 may be configured for predefining, in the time domain, the position of the DCI-bearing enhanced search space in the time domain as a position other than any Orthogonal Frequency Division Multiplexing (OFDM) symbol position occupied by a Physical Downlink Control Channel (PDCCH) in any subframe or in a subframe other than subframes 0 and 5, or as starting from an OFDM symbol starting position in any subframe or in a subframe other than subframes 0 and 5.

The second determining module 21 may be further configured for predefining, in the frequency domain, the position of the DCI-bearing enhanced search space in the frequency domain as 2*N Physical Resource Block (PRB) pairs of two sidebands in the frequency domain, or N PRB pairs mapped with equal intervals, or N discrete PRB pairs around a center frequency corresponding to a 1.4 MHz bandwidth, or N fixed successive PRB pairs around a center frequency corresponding to a 1.4 MHz bandwidth, or top N PRB pairs according to PRB numbering. The N is a natural number, and may be 1 or 2 or 4, or 8 or 16 or 32.

The second determining module 21 may be further configured for determining the positions of the enhanced search space in the time domain and the frequency domain according to an Orthogonal Frequency Division Multiplexing (OFDM) symbol starting position in case of a small bandwidth and an OFDM symbol starting position in case of a large bandwidth. The small bandwidth may refer to the system bandwidth less than or equal to k PRBs. The large bandwidth may refer to the system bandwidth greater than or equal to h PRBs. The k is a natural number, and may be 6 or 15 or 25. The h is a natural number, and may be 25 or 50. The OFDM symbol starting position in case of the small bandwidth may be the 4th or the 5th OFDM symbol. The OFDM symbol starting position in case of the large bandwidth may be the 3th or the 4th OFDM symbol.

Alternatively, the second determining module 21 may be further configured for: determining, according to an Orthogonal Frequency Division Multiplexing (OFDM) symbol starting position in a general subframe and an OFDM symbol starting position in a Multicast/Broadcast over Single Frequency Network (MBSFN) subframe, the positions of the enhanced search space in the time domain and the frequency domain;

or determining, according to an Orthogonal Frequency Division Multiplexing (OFDM) symbol starting position in a general subframe and an OFDM symbol starting position in a Time Division Duplex (TDD) special subframe, the positions of the enhanced search space in the time domain and the frequency domain;

or determining, according to an Orthogonal Frequency Division Multiplexing (OFDM) symbol starting position of a Long Term Evolution (LTE) UE and an OFDM symbol starting position of a low cost UE, the positions of the enhanced search space in the time domain and the frequency domain;

or determining, according to an Orthogonal Frequency Division Multiplexing (OFDM) symbol starting position of a routine component carrier and an OFDM symbol starting position of a new-type component carrier, the positions of the enhanced search space in the time domain and the frequency domain;

or determining, according to time-frequency position indicating signaling carried by a Physical Broadcast Channel (PBCH), the positions of the enhanced search space in the time domain and the frequency domain. The time-frequency position indicating signaling may include at least a parameter of: a subframe numbering, an OFDM starting symbol, a position in the frequency domain, and an N.

The enhanced search space may be an enhanced common search space or an enhanced user-specific search space.

The second determining module 21 may be further configured for: when the enhanced search space is an enhanced user-specific search space, before receiving radio resource control (RRC) signaling, predefining the positions of the enhanced user-specific search space in the time domain and the frequency domain (where the enhanced user-specific search space may be referred to as a second enhanced common search space), and after receiving the RRC signaling, determining, according to the RRC signaling, the positions of the enhanced user-specific search space in the time domain and the frequency domain.

The information receiving module 22 may be configured for determining, in the same way as a base station does, a Physical Downlink Shared Channel (PDSCH) transmission mode corresponding to the DCI, an antenna port used in the PDSCH transmission mode, and an aggregation level and an amount of candidate sets for transmitting the DCI; detecting an enhanced Physical Downlink Control Channel (ePDCCH) transmission mode corresponding to the DCI; and receiving the DCI in accordance with the PDSCH transmission mode, the antenna port used in the PDSCH transmission mode, the aggregation level and the amount of candidate sets as determined, and the detected ePDCCH transmission mode.

The DCI may be borne in the enhanced common search space or the enhanced user-specific search space.

the DCI borne in the enhanced user-specific search space may be user-specific information and common information, or may be user-specific information only.

An aggregation level and an amount of candidate sets for transmitting the DCI may be fixed values or may be determined according to a second parameter. The second parameter may include one or more of a subframe type, a Cyclic Prefix (CP) type, a system bandwidth, a DCI format, an amount of available Resource Elements (RE) in a PRB pair, a number of PRB pairs configured for transmitting the DCI, a User Equipment (UE) type, and a component carrier type.

The fixed values may be of one or two kinds.

When the fixed values are of one kind, an aggregation level may be 2, 4, 8, 16, 32, the amount of candidate sets may be 8, 6, 4, 2. When the fixed values are of two kinds, an aggregation level may be 8 and 16 or 4 and 8, the amount of candidate sets may be 4 and 2 or 2 and 1.

The information receiving module 22 may be further configured for:

determining, according to a system bandwidth of a small bandwidth or of a large bandwidth, the aggregation level for transmitting the DCI;

and/or determining, according to a subframe type of a general subframe or of a Multicast/Broadcast over Single Frequency Network (MBSFN) subframe, the aggregation level for transmitting the DCI;

and/or determining, according to a subframe type of a general subframe or of a Time Division Duplex (TDD) special subframe, the aggregration level for transmitting the DCI;

and/or determining, according to a UE type of a Long Term Evolution (LTE) UE or of a low cost UE, the aggregration level for transmitting the DCI;

and/or determining, according to a component carrier type of a routine component carrier or of a new-type component carrier, the aggregation level for transmitting the DCI;

and/or determining the aggregation level according to the DCI format;

and/or determining the aggregation level for transmitting the DCI by determining whether the amount of available REs in a PRB pair is greater than a threshold X, where the X may be 104;

and/or determining the aggregation level for transmitting the DCI by determining whether the number of PRB pairs configured for transmitting the DCI is greater than a threshold N. The N may be 1, 2, 4, 8.

The information receiving module 22 may be further configured for:

determining a PDSCH transmission mode corresponding to the DCI as a PDSCH transmission mode fixedly based on a DMRS time-frequency position (where a time-frequency position in such a transmission mode is the same as an existing DMRS, though with different port number definitions);

and/or determining a PDSCH transmission mode corresponding to the DCI according to a subframe type of a general subframe or of a Multicast/Broadcast over Single Frequency Network (MBSFN) subframe;

and/or determining a PDSCH transmission mode corresponding to the DCI according to a subframe type of a general subframe or of a Time Division Duplex (TDD) special subframe;

and/or determining a PDSCH transmission mode corresponding to the DCI according to a UE type of a general UE or of a low cost UE;

and/or determining a PDSCH transmission mode corresponding to the DCI according to a component carrier type of a routine component carrier (compatible component carrier) or a new-type component carrier.

The information receiving module 22 may be further configured for determining an antenna port used in the PDSCH transmission mode as a fixed port or according to at least one of a Physical Cell ID (PCI), a subframe index, the subframe type, a Cyclic Prefix (CP) type, the UE type, a DCI signaling, and the component carrier type.

The information receiving module 22 may be further configured for: receiving the DCI at a DeModulation Reference Signal (DMRS) port according to an enhanced Physical Downlink Control Channel (ePDCCH) transmission mode of distributed mapping or centralized mapping. A DMRS port of a fixed port may be adopted, or a DMRS port may be dynamically selected according to at least one of the PCI, the subframe index, the subframe type, the CP type, the UE type, and the component carrier type. The fixed port may include a DMRS port consistent with an eREG port in a D-eCCE.

A method according to an embodiment herein is elaborated below with reference to specific embodiments.

Embodiment 1

In the embodiment, time and frequency domains, an aggregation level, and a transmission mode are fixed, and the method for transmitting DCI is implemented as follows.

An enhanced common search space may be predefined to include all subframes and any OFDM symbol following a PDCCH in the time domain, and to occupy 4 PRB pairs in two sidebands of a 10 MHz system bandwidth in the frequency domain. There are two fix aggregration levels for transmitting the DCI, namely 8 and 16, which respectively correspond to candidate sets 4 and 2. In transmitting DCI in the enhanced common search space, an ePDCCH may bear DCI in Format 1C. Distributed mapping may be adopted. Ports 107 and 109 may be selected alternately for a distributed eREG. It may be scheduled, through the ePDCCH, that a PDSCH bears common information in a DMRS-based transmission mode, transmitted using port 7.

Embodiment 2

In the embodiment, a time domain is fixed, a frequency domain is fixed or can be offset, an aggregation level and a transmission mode are fixed, and the method for transmitting DCI is implemented as follows.

An enhanced common search space may be predefined to include all subframes and any OFDM symbol following a PDCCH in the time domain, and to occupy, in the frequency domain, 4 PRB pairs, mapped with equal intervals, of a 10 MHz system bandwidth. Frequency domain cyclic offset may be performed according to PCI. There are two fix aggregration levels for transmitting the DCI, namely 8 and 16, which respectively correspond to candidate sets 2 and 1. In transmitting DCI in the enhanced common search space, an ePDCCH may bear DCI in Format 1A. Centralized mapping may be adopted. Ports 107 and 108 may be selected alternately for a centralized eREG. A DMRS used may occupy 24 REs. It may be scheduled, through the ePDCCH, that a PDSCH bears common information in a DMRS-based transmission mode, transmitted using port 7.

Embodiment 3

In the embodiment, notification of a time domain of an enhanced search space may be implemented through signaling, a frequency domain, an aggregation level, and a transmission mode are fixed, a transmission port may be indicated, and the method for transmitting DCI is implemented as follows.

It may be determined, according to time-frequency position indicating signaling carried by a PBCH, that the enhanced search space includes, in the time domain, subframes {1,2,3,4,6,7,8,9} (where it may be notified, through PBCH-borne 2 bits, of a duration of the configuration, and the duration may be selected from a set {40 ms, 80 ms, 120 ms, 160 ms}) and any OFDM symbol following a PDCCH, and to occupy, in the frequency domain, 4 successive PRB pairs around a center frequency corresponding to a 5 MHz system bandwidth. For transmitting the DCI, the aggregation level may be 8 and the amount of candidate sets may be 2 with N=4 and a Cyclic Prefix type being an extended Cyclic Prefix; or the aggregation level may be 4 and the amount of candidate sets may be 4 with N=2 and a subframe type being an MBSFN subframe. In transmitting DCI in the enhanced common search space, an ePDCCH may bear DCI including antenna port/scrambling identity SCID information in Format 1A. Distributed mapping may be adopted. Ports 107 and 108 may be selected alternately for a distributed eREG. A DMRS used may occupy 12 REs. It may be scheduled, through the ePDCCH, that a PDSCH bears common information in a DMRS-based transmission mode, transmitted using a DCI-indicated port.

Embodiment 4

In the embodiment, a component carrier type is an NCT, time and frequency domains, an aggregation level, and a transmission mode are fixed, and the method for transmitting DCI is implemented as follows.

An enhanced search space according to the component carrier type of a new-type component carrier may include, in the time domain, all subframes and all OFDM symbols, and occupy, in the frequency domain, equally spaced 4 PRB pairs of a 10 MHz system bandwidth. For transmitting the DCI, aggregation levels 4 and 8, and amounts of candidate sets 4 and 2, may be determined according to an amount of available REs in a PRB pair 104. In transmitting DCI in an enhanced common search space, an ePDCCH may bear DCI in Format 1A. Distributed mapping may be adopted. Ports 107 and 108 may be selected alternately for a distributed eREG. A DMRS used may occupy 24 REs. It may be scheduled, through the ePDCCH, that a PDSCH bears common information in a DMRS-based transmission mode. An antenna port 7 or 8 may be used. An SCID may be predefined as 0. X=PCI.

Embodiment 5

In the embodiment, for a low cost UE, time and frequency domains, an aggregration level, and a transmission mode are fixed, and the method for transmitting DCI is implemented as follows.

An enhanced search space according to a designated UE type of a low cost UE may include, in the time domain, subframes {1,2,3,4,6,7,8,9} and any OFDM symbol following a PDCCH, and occupy, in the frequency domain, 2 fixed successive PRB pairs around a center frequency corresponding to a 1.4 MHz system bandwidth. For transmitting the DCI, aggregation levels are 2 and 4, and amounts of candidate sets are 4 and 2 with N=2 and a CP type of a normal CP. In transmitting DCI in the enhanced common search space, a Compact DCI format may be used in an ePDCCH. Distributed mapping may be adopted. A fixed port 107 is used for a distributed eREG. A DMRS used may occupy 12 REs. It may be scheduled, through the ePDCCH, that a PDSCH bears common information in a DMRS-based transmission mode. A fixed antenna port, i.e. port 7, may be used. An SCID may be predefined as 0.

Embodiment 6

In the embodiment, for an enhanced search space, notification of a time domain is implemented through 2 sets of signaling, a frequency domain, an aggregation level, and a transmission mode are fixed, a transmission port may be indicated, and the method for transmitting DCI is implemented as follows.

It may be determined, according to time-frequency position indicating signaling carried by a PBCH, that the enhanced search space is formed by all subframes in the time domain. It is notified, through PBCH-borne 2 bits, the position of an OFDM starting symbol. 1 bit thereof is for notifying an LTE UE that an OFDM symbol starting position may be the 4th OFDM symbol in a set {3, 4}, the other bit is for notifying a low cost UE that the OFDM symbol starting position may be the 5th OFDM symbol in a set {4, 5}. The enhanced search space may occupy, in the frequency domain, 2 successive PRB pairs around a center frequency corresponding to a 5 MHz system bandwidth. For transmitting the DCI, aggregation levels may be 2 and 4, respectively with amounts of candidate sets 2 and 1 for N=2 and a CP type of an extended CP. In transmitting DCI in an enhanced common search space, an ePDCCH may bear DCI including antenna port/SCID information in Format 1A. Distributed mapping may be adopted. Ports 107 and 108 may be selected alternately for a distributed eREG. A DMRS used may occupy 12 REs. It may be scheduled, through the ePDCCH, that a PDSCH bears common information in a DMRS-based transmission mode, transmitted using a DCI-indicated port.

Embodiment 7

In the embodiment, a component carrier type is an NCT, a time domain is fixed, notification of a frequency domain is implemented with two notifications, an aggregation level and a transmission mode are fixed, a transmission port may be indicated, and the method for transmitting DCI is implemented as follows.

According to a component carrier type of a new-type component carrier, an enhanced user-specific search space may include, in the time domain, all subframes, with an OFDM starting symbol predefined as any OFDM symbol starting from the first OFDM, and occupy, in the frequency domain, 2 predefined successive PRB pairs around a center frequency corresponding to a 10 MHz system bandwidth. For transmitting the DCI, aggregation levels may be 4 and 8, and amounts of candidate sets may be 4 and 2 with N=2 and a CP type of a normal CP. In transmitting DCI in an enhanced common search space, an ePDCCH may bear DCI including antenna port/SCID information in Format 1A. Distributed mapping may be adopted. Ports 107 and 108 may be selected alternately for a distributed eREG. A DMRS used may occupy 12 REs. It may be scheduled, through the ePDCCH, that a PDSCH bears common information in a DMRS-based transmission mode, transmitted using a DCI-indicated port.

After an RRC signaling notification is received, it may be determined that the enhanced user-specific search space includes, in the time domain, all subframes, with an OFDM starting symbol predefined as any OFDM symbol starting from the first OFDM, and occupies in the frequency domain, according to the RRC signaling, 4 successive PRB pairs around a center frequency corresponding to a 10 MHz system bandwidth. For transmitting the DCI, aggregation levels may be 8 and 16, and amounts of candidate sets may be 2 and 1 with N=4 and a CP type of a normal CP. In transmitting DCI in the enhanced common search space, an ePDCCH may bear DCI including antenna port/SCID information in Format 2C. Distributed mapping may be adopted. Ports 107 and 109 may be selected alternately for a distributed eREG. A DMRS used may occupy 24 REs. It may be scheduled, through the ePDCCH, that a PDSCH bears common information in a DMRS-based transmission mode. An antenna port of port 7 may be used. An SCID may be predefined as 0. X=PCI.

Embodiment 8

In the embodiment, a component carrier type is an NCT, a second common search space, a time domain may be fixed, notification of a frequency domain is implemented with two notifications, an aggregation level and a transmission mode are fixed, a transmission port may be indicated, and the method for transmitting DCI is implemented as follows.

It may be determined, according to a component carrier type of a new-type component carrier, that an enhanced common search space includes, in the time domain, all subframes, with an OFDM starting symbol predefined as any OFDM symbol starting from the first OFDM, and occupies, in the frequency domain, 2 predefined successive PRB pairs around a center frequency corresponding to a 10 MHz system bandwidth; an enhanced second common search space includes, to in the time domain, all subframes, with an OFDM starting symbol predefined as any OFDM symbol starting from the first OFDM, and occupies, in the frequency domain, 2*2 predefined PRB pairs of a 10 MHz system bandwidth sideband. For transmitting DCI, for the enhanced common search space, aggregation levels 4 and 8, respectively with amounts of candidate sets 4 and 2, may be used with N=2 and a CP type of a normal CP; for the enhanced second common search space, aggregration levels 4, 8 and 16, with amounts of candidate sets 4, 2 and 1 may be used with N=4 and a CP type of a normal CP. In transmitting DCI in the enhanced common search space, an ePDCCH may bear DCI including antenna port/SCID information in Format 1A. Distributed mapping may be adopted. Ports 107 and 108 may be selected alternately for a distributed eREG. A DMRS used may occupy 12 REs. It may be scheduled, through the ePDCCH, that a PDSCH bears common information in a DMRS-based transmission mode, transmitted using a DCI-indicated port. In transmitting DCI in the enhanced second common search space, an ePDCCH may bear DCI in Format 2C. Distributed mapping may be adopted. Ports 107 and 109 may be selected alternately for a distributed eREG. A DMRS used may occupy 24 REs. It may be scheduled, through the ePDCCH, that a PDSCH bears user-specific information ing a DMRS-based transmission mode, transmitted using a DCI-indicated port.

After an RRC signaling notification is received, it may be determined that an enhanced user-specific search space includes, in the time domain, all subframes, with an OFDM starting symbol predefined as any OFDM symbol starting from the first OFDM, and occupies, in the frequency domain according to the RRC signaling notification, 4 successive PRB pairs around a center frequency corresponding to a 10 MHz system bandwidth. For transmitting the DCI, aggregration levels 8 and 16, and amounts of candidate sets 2 and 1 may be used with N=4 and a CP type of a normal CP. In transmitting DCI in the enhanced common search space, an ePDCCH may bear DCI including antenna port/SCID information in Format 2C. Distributed mapping may be adopted. Ports 107 and 109 may be selected alternately for a distributed eREG. A DMRS used may occupy 24 REs. It may be scheduled, through the ePDCCH, that a PDSCH bears common information in a DMRS-based transmission mode. An antenna port of port 7 may be used. An SCID may be predefined as 0. X=PCI.

INDUSTRIAL APPLICABILITY

To sum up, with an embodiment herein, it is possible to implement DCI transmission through an enhanced search space in both NCT independent operation and access of a large-bandwidth system by a low cost UE when DCI may not be transmitted using a search space of a PDCCH area.

What described are merely embodiments of the disclosure, and are not intended to limit the scope of the present disclosure.

The invention claimed is:

1. A method for transmitting Downlink Control Information (DCI), comprising:
   determining, by a base station, positions of a DCI carrying enhanced search space in a time domain and a frequency domain; and transmitting DCI at the positions of the enhanced search space in the time domain and the frequency domain,
   wherein the determining, by a base station, positions of a DCI-carrying enhanced search space in a time domain and a frequency domain comprises: determining, by the base station according to a first parameter, the positions of the enhanced search space in the time domain and the frequency domain, the first parameter comprising at least one of: a subframe type, a Cyclic Prefix (CP) type, a User Equipment (UE) type, and a component carrier type.

2. A method for transmitting Downlink Control Information (DCI), comprising:
   determining, by a base station, positions of a DCI-carrying enhanced search space in a time domain and a frequency domain; and transmitting DCI at the positions of the enhanced search space in the time domain and the frequency domain,
   wherein the determining, by a base station, positions of a DCI-carrying enhanced search space in a time domain and a frequency domain comprises: predefining, by the base station, the positions of the DCI-carrying enhanced search space in the time domain and the frequency domain,
   wherein the predefining, by the base station, the position of the DCI-carrying enhanced search space in the frequency domain comprises: predefining, in the frequency domain, the position of the DCI carrying enhanced search space in the frequency domain as 2*N Physical Resource Block (PRB) pairs of two sidebands in the frequency domain, or N PRB pairs mapped with equal intervals, or N discrete PRB pairs around a center frequency corresponding to a 1.4 MHz bandwidth, or N fixed successive PRB pairs around a center frequency corresponding to a 1.4 MHz bandwidth, or top N PRB pairs according to PRB numbering, the N being a natural number.

3. The method according to claim 1,
   wherein the first parameter further comprises at least one of a system bandwidth and a time-frequency position indicating signaling,
   wherein the determining, by the base station according to a first parameter, the positions of the enhanced search space in the time domain and the frequency domain comprises at least one of:
   determining, by the base station, the positions of the enhanced search space in the time domain and the frequency domain according to an Orthogonal Frequency Division Multiplexing (OFDM) symbol starting position in case of a small bandwidth and an OFDM symbol starting position in case of a large bandwidth, the small bandwidth referring to the system bandwidth less than or equal to k PRBs, the large bandwidth referring to the system bandwidth greater than or equal to h PRBs, the k, h being natural numbers;
   determining, by the base station according to an Orthogonal Frequency Division Multiplexing (OFDM) symbol starting position in a general subframe and an OFDM symbol starting position in a Multicast/Broadcast over Single Frequency Network (MBSFN) subframe, the positions of the enhanced search space in the time domain and the frequency domain;

determining, by the base station according to an Orthogonal Frequency Division Multiplexing (OFDM) symbol starting position in a general subframe and an OFDM symbol starting position in a Time Division Duplex (TDD) special subframe, the positions of the enhanced search space in the time domain and the frequency domain;

determining, by the base station according to an Orthogonal Frequency Division Multiplexing (OFDM) symbol starting position of a Long Term Evolution (LTE) UE and an OFDM symbol starting position of a low cost UE, the positions of the enhanced search space in the time domain and the frequency domain;

determining, by the base station according to an Orthogonal Frequency Division Multiplexing (OFDM) symbol starting position of a routine component carrier and an OFDM symbol starting position of a new-type component carrier, the positions of the enhanced search space in the time domain and the frequency domain;

and determining, by the base station according to time-frequency position indicating signaling carried by a Physical Broadcast Channel (PBCH), the positions of the enhanced search space in the time domain and the frequency domain.

4. The method according to claim 1, wherein the enhanced search space is an enhanced common search space or an enhanced user-specific search space;

when the enhanced search space is an enhanced user-specific search space, before receiving radio resource control (RRC) signaling, the base station predefines the positions of the enhanced user-specific search space in the time domain and the frequency domain, and after receiving the RRC signaling, determines, according to the RRC signaling, the positions of the enhanced user-specific search space in the time domain and the frequency domain.

5. The method according to claim 4, wherein the DCI is borne in the enhanced common search space or the enhanced user-specific search space;

the DCI borne in the enhanced user-specific search space is user-specific information and common information, or is user-specific information.

6. The method according to claim 1, wherein an aggregration level and an amount of candidate sets for transmitting the DCI are fixed values or are determined according to a second parameter, the second parameter comprising at least one of the subframe type, the Cyclic Prefix (CP) type, a system bandwidth, a DCI format, an amount of available Resource Elements (RE) in a PRB pair, a number of PRB pairs configured for transmitting the DCI, the User Equipment (UE) type, and the component carrier type.

7. The method according to claim 6, wherein the fixed values are of one or two kinds.

8. The method according to claim 6, wherein the aggregration level for transmitting the DCI is determined according to the second parameter by at least one of:

determining, according to a system bandwidth of a small bandwidth or of a large bandwidth, the aggregation level for transmitting the DCI, the small bandwidth referring to the system bandwidth less than or equal to k PRBs, the large bandwidth referring to the system bandwidth greater than or equal to h PRBs, the k, h being natural numbers;

determining, according to the subframe type of a general subframe or of a Multicast/Broadcast over Single Frequency Network (MBSFN) subframe, the aggregation level for transmitting the DCI;

determining, according to the subframe type of a general subframe or of a Time Division Duplex (TDD) special subframe, the aggregation level for transmitting the DCI;

determining, according to the UE type of a Long Term Evolution (LTE) UE or of a low cost UE, the aggregration level for transmitting the DCI;

determining, according to the component carrier type of a routine component carrier or of a new-type component carrier, the aggregation level for transmitting the DCI;

determining the aggregration level according to the DCI format;

determining whether the amount of available REs in a PRB pair is greater than a threshold X;

and determining whether the number of PRB pairs configured for transmitting the DCI is greater than a threshold N.

9. The method according to claim 1, further comprising at least one of:

determining a Physical Downlink Shared Channel (PDSCH) transmission mode corresponding to the DCI as a PDSCH transmission mode fixedly based on a DeModulation Reference Signal (DMRS) time-frequency position;

determining a PDSCH transmission mode corresponding to the DCI according to the subframe type of a general subframe or of a Multicast/Broadcast over Single Frequency Network (MBSFN) subframe;

determining a PDSCH transmission mode corresponding to the DCI according to the subframe type of a general subframe or of a Time Division Duplex (TDD) special subframe;

determining a PDSCH transmission mode corresponding to the DCI according to the UE type of a general UE or of a low cost UE;

and determining a PDSCH transmission mode corresponding to the DCI according to the component carrier type of a routine component carrier or of a new-type component carrier.

10. The method according to claim 9, further comprising: determining an antenna port used in the PDSCH transmission mode as a fixed port or according to at least one of a Physical Cell ID (PCI), a subframe index, the subframe type, the Cyclic Prefix (CP) type, the UE type, a DCI signaling, and the component carrier type.

11. The method according to claim 1, further comprising: determining an enhanced Physical Downlink Control Channel (ePDCCH) transmission mode corresponding to the DCI as distributed mapping or centralized mapping; and determining a DMRS port as a fixed port or dynamically selecting a DMRS port according to at least one of the PCI, the subframe index, the subframe type, the CP type, the UE type, and the component carrier type.

12. A base station, comprising:
at least one hardware processor;
a non-transitory computer-readable medium storing computer readable instructions, the instructions being executable by the at least one hardware processor for:
determining positions of a DCI carrying enhanced search space in a time domain and a frequency domain; and
transmitting DCI at the positions of the enhanced search space in the time domain and the frequency domain, wherein the instructions are executable by the at least one hardware processor for: determining, according to a first parameter, the positions of the enhanced search space in the time domain and the frequency domain, the first parameter comprising at least one of: a subframe type, a Cyclic Prefix (CP) type, a User Equipment (UE) type and a component carrier type.

13. A base station, comprising:
at least one hardware processor;
a non-transitory computer-readable medium storing computer readable instructions, the instructions being executable by the at least one hardware processor for:
determining positions of a DCI-carrying enhanced search space in a time domain and a frequency domain; and transmitting DCI at the positions of the enhanced search space in the time domain and the frequency domain,
wherein the instructions are executable by the at least one hardware processor for: predefining the positions of the DCI-carrying enhanced search space in the time domain and the frequency domain,
wherein the instructions are executable by the at least one hardware processor for: predefining, in the frequency domain, the position of the DCI carrying enhanced search space in the frequency domain as 2*N Physical Resource Block (PRB) pairs of two sidebands in the frequency domain, or N PRB pairs mapped with equal intervals, or N discrete PRB pairs around a center frequency corresponding to a 1.4 MHz bandwidth, or N fixed successive PRB pairs around a center frequency corresponding to a 1.4 MHz bandwidth, or top N PRB pairs according to PRB numbering, the N being a natural number.

14. A User Equipment (UE), comprising:
at least one hardware processor;
a non-transitory computer-readable medium storing computer readable instructions, the instructions being executable by the at least one hardware processor for:
determining positions of a DCI carrying enhanced search space in a time domain and a frequency domain; and
receiving DCI at the positions of the enhanced search space in the time domain and the frequency domain,
wherein the instructions are executable by the at least one hardware processor for: determining the positions of the DCI-carrying enhanced search space in the time domain and the frequency domain in the same way as a base station does, by determining, according to a first parameter, the positions of the enhanced search space in the time domain and the frequency domain, the first parameter comprising at least one of: a subframe type, a Cyclic Prefix (CP) type, a User Equipment (UE) type, and a component carrier type.

* * * * *